(12) United States Patent
Cai et al.

(10) Patent No.: US 10,834,723 B2
(45) Date of Patent: Nov. 10, 2020

(54) RESOURCE INDICATION METHOD AND RELATED DEVICE

(71) Applicant: Huawei Technologies Co., Ltd., Shenzhen (CN)

(72) Inventors: Yu Cai, Beijing (CN); Jian Wang, Beijing (CN); Yongbo Zeng, Beijing (CN); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/325,075

(22) PCT Filed: Aug. 12, 2016

(86) PCT No.: PCT/CN2016/094951
§ 371 (c)(1),
(2) Date: Feb. 12, 2019

(87) PCT Pub. No.: WO2018/027934
PCT Pub. Date: Feb. 15, 2018

(65) Prior Publication Data
US 2019/0357213 A1 Nov. 21, 2019

(51) Int. Cl.
H04W 72/04 (2009.01)
H04W 4/80 (2018.01)
(Continued)

(52) U.S. Cl.
CPC ....... *H04W 72/0453* (2013.01); *H04L 5/0092* (2013.01); *H04W 4/80* (2018.02);
(Continued)

(58) Field of Classification Search
CPC ... H04W 72/00; H04W 72/0453; H04W 4/80; H04W 56/001; H04W 28/16;
(Continued)

(56) References Cited

U.S. PATENT DOCUMENTS

2014/0044085 A1 2/2014 Hong
2014/0341141 A1 11/2014 Nguyen et al.
(Continued)

FOREIGN PATENT DOCUMENTS

CN 101459641 A 6/2009
CN 102395207 A 3/2012
(Continued)

OTHER PUBLICATIONS

Foreign Communication From a Counterpart Application, European Application No. 16912389.0, Partial Supplementary European Search Report dated May 15, 2019, 13 pages.
(Continued)

*Primary Examiner* — Warner Wong
(74) *Attorney, Agent, or Firm* — Conley Rose, P.C.

(57) ABSTRACT

A resource indication method and a related device, where the method includes obtaining system resource information of a second system, and sending indication information using a resource of a first system, where the indication information indicates the system resource information such that a device receiving the indication information determines the system resource information based on the indication information. Hence, an indication message indicating a system resource of the second system is sent using the resource of the first system. Therefore, a user equipment directly determine the system resource information of the second system based on the indication information, and efficiency of accessing the second system by the user equipment is improved.

18 Claims, 8 Drawing Sheets

(51) Int. Cl.
*H04L 5/00* (2006.01)
*H04W 56/00* (2009.01)
*H04L 29/08* (2006.01)
*H04L 12/24* (2006.01)

(52) U.S. Cl.
CPC ....... *H04W 56/001* (2013.01); *H04L 41/0866* (2013.01); *H04L 67/1078* (2013.01)

(58) Field of Classification Search
CPC .............. H04L 41/085; H04L 41/0866; H04L 67/1076; H04L 67/1078
See application file for complete search history.

(56) References Cited

U.S. PATENT DOCUMENTS

| | | | |
|---|---|---|---|
| 2016/0286580 A1 | 9/2016 | Liu et al. | |
| 2017/0257807 A1* | 9/2017 | Zacharias | H04W 76/16 |
| 2017/0331577 A1* | 11/2017 | Parkvall | H04L 5/0053 |
| 2018/0020462 A1* | 1/2018 | Xiong | H04W 76/16 |
| 2018/0110060 A1 | 4/2018 | Huang et al. | |
| 2018/0219596 A1* | 8/2018 | He | H04B 7/0695 |
| 2018/0316472 A1* | 11/2018 | John Wilson | H04L 5/0035 |
| 2018/0332585 A1* | 11/2018 | Faurie | H04W 72/0453 |

FOREIGN PATENT DOCUMENTS

| | | |
|---|---|---|
| CN | 103947276 A | 7/2014 |
| CN | 104619025 A | 5/2015 |
| CN | 104936294 A | 9/2015 |
| CN | 105430751 A | 3/2016 |
| WO | 2015119862 A1 | 8/2015 |
| WO | 2015130034 A1 | 9/2015 |

OTHER PUBLICATIONS

Machine Translation and Abstract of Chinese Publication No. CN101459641, Jun. 17, 2009, 16 pages.
Machine Translation and Abstract of Chinese Publication No. CN105430751, Mar. 23, 2016, 25 pages.
Foreign Communication From a Counterpart Application, PCT Application No. PCT/CN2016/094951, English Translation of International Search Report dated May 3, 2017, 2 pages.
Foreign Communication From a Counterpart Application, PCT Application No. PCT/CN2016/094951, English Translation of Written Opinion dated May 3, 2017, 5 pages.

* cited by examiner

RESOURCE INDICATION METHOD AND RELATED DEVICE

CROSS-REFERENCE TO RELATED APPLICATIONS

This application is a U.S. National Stage of International Patent Application No. PCT/CN2016/094951 filed on Aug. 12, 2016, which is hereby incorporated by reference in its entirety.

TECHNICAL FIELD

The present invention relates to the field of communications technologies, and in particular, to a resource indication method and a related device.

BACKGROUND

A cellular-based narrow band Internet of Things (Narrow Band Internet of Things, NB-IoT) focuses on a low power wide area (Low Power Wide Area, LPWA) Internet of Things (Internet of Things, IoT) market, and can be widely applied globally. The NB-IoT may be widely applied to a plurality of vertical industries, for example, remote metering, asset tracking, intelligent parking, and intelligent agriculture. The NB-IoT is constructed in a cellular network, and occupies a frequency band of 180 kHz approximately. A carrier includes 12 subcarriers, and a spacing between subcarriers is 15 kHz. The NB-IoT may be directly deployed in a Long Term Evolution (Long Term Evolution, LTE) system.

In an existing technical solution, a spacing between subcarriers in the LTE system is 15 kHz. Because the spacing between subcarriers in the NB-IoT system is the same as the spacing between subcarriers in the LTE system, the NB-IoT system can be directly deployed on a resource block of the LTE system. When user equipment needs to communicate by using the NB-IoT system, the user equipment needs to blindly search for the NB-IoT system in the LTE system. To be specific, to determine a carrier frequency of the NB-IoT system, the user equipment needs to try a plurality of frequencies one by one in the LTE system. This reduces efficiency of determining a second system by the user equipment.

SUMMARY

Embodiments of the present invention provide a resource indication method and a related device. An indication message used to indicate a system resource of a second system is sent by using a resource of a first system. Therefore, user equipment can directly determine system resource information of the second system based on the indication information, and efficiency of accessing the second system by the user equipment is improved.

According to a first aspect, an embodiment of the present invention provides a resource indication method, including: obtaining system resource information of a second system; and sending indication information by using a resource of a first system, where the indication information is used to indicate the system resource information, so that a device receiving the indication information determines the system resource information based on the indication information. Because the indication information is sent by using the resource of the first system, the device receiving the indication information determines the system resource information based on the indication information. Therefore, user equipment receiving the indication information can directly determine the system resource information of the second system based on the indication information, without trying a plurality of frequencies one by one to determine the system resource information of the second system. This improves efficiency of determining the second system by the user equipment.

In a possible implementation, the system resource information is information about a resource occupied by the second system in the first system. To be specific, the second system is deployed in the first system.

In a possible implementation, before obtaining the system resource information of the second system, the network device may further determine information about a resource occupied by the second system in the first system, and specifically, determine, based on resource block information of a plurality of resource blocks included in the first system and information of a single carrier in the second system, at least one piece of candidate resource information of the single carrier deployed in the first system; where the resource block information includes a frequency range of each resource block in the plurality of resource blocks, and the information of the single carrier includes a second frequency width of the single carrier.

In a process of determining the system resource of the second system by the network device, in a feasible implementation, a first frequency width of each resource block in the first system is different from the second frequency width of the single carrier.

Optionally, the single carrier of the second system occupies a preset quantity of resource blocks in the first system, and the preset quantity is a rounded-up ratio of the second frequency width of the single carrier of the second system to a first frequency width of a resource block in the first system. In this calculation method, the single carrier of the second system can be allowed to occupy a minimum quantity of resource blocks in the first system, and therefore waste of resource blocks is not caused in the first system.

The obtaining system resource information of a second system is specifically determining the system resource information of the second system from the at least one piece of candidate resource information. In a specific implementation process, when a quantity of carriers in the second system is 1, one piece of candidate resource information is selected from the at least one piece of candidate resource information as the system resource information: or when a quantity of carriers in the second system is more than 1, a quantity of candidate resource information same as the quantity of the carriers is selected from the at least one piece of candidate resource information as the system resource information.

In a feasible implementation, the system resource information is a center frequency of a carrier of the second system: and the center frequency of the carrier of the second system is in a range separated from an integer multiple of a preset frequency by a preset threshold. Optionally, the preset threshold is half a spacing between subcarriers of the second system or half a spacing between subcarriers of the first system. The integer multiple of the preset frequency is a frequency used by the user equipment to access the first system. Therefore, when the center frequency of the carrier of the second system is determined, the center frequency of the carrier of the second system is preferably deployed in the range separated from the integer multiple of the preset frequency by the preset threshold, so that the user equipment can access the second system.

In another feasible implementation, the system resource information is a center frequency of a carrier of the second system: and the center frequency of the carrier of the second system is a frequency location that has a minimum offset from an integer multiple of a preset frequency, and the offset is an integer multiple of a preset minimum frequency width. Therefore, the center frequency of the carrier of the second system can approach the integer multiple of the preset frequency maximally, so that the user equipment can access the second system.

In a feasible implementation, the network device may directly obtain the system resource information of the second system, where the system resource information of the second system is determined by another device. In this embodiment of the present invention, the system resource information of the second system may be determined by a deployment device, where the deployment device performs a resource deployment method. For details about determining the system resource information of the second system by the deployment device, refer to a third aspect.

In a feasible implementation, the indication information includes a resource identifier corresponding to the system resource information. In a feasible solution, some or all determined candidate resource information may be numbered, and a mapping relationship between each number and candidate resource information is determined, where the candidate resource information is a center frequency of the single carrier of the second system. When the system resource information is determined from the at least one piece of candidate resource information, a number corresponding to the system resource information is determined, and the network device indicates the system resource by using a number included in the indication information. Therefore, after all candidate resource information is determined, a plurality of pieces of candidate resource information that may be used for deploying the second system may be finally determined according to an actual requirement, and then the system resource information of the second system is determined from the finally determined plurality of pieces of candidate resource information.

In a feasible implementation, the indication information includes a radio channel number ARFCN corresponding to the system resource information. The network device indicates the system resource by using the ARFCN included in the indication information.

In a feasible implementation, the indication information further includes a service identifier corresponding to the system resource information. For example, if the service identifier is 0, it indicates that the second system is used for an NB-IoT service; if the service identifier is 1, it indicates that the second system is used for an MTC service: or if the service identifier is 2, it indicates that the second system is used for a URLLC service.

In a feasible implementation, the indication information is included in system information of the first system. The system information includes a master information block (Master Information Block, MIB), a plurality of system information blocks (System Information Blocks, SIBs), and the like. The network device may send the indication message by using the system information.

In a feasible implementation, the indication information is sent by using a broadcast channel of the first system.

In a feasible implementation, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

According to a second aspect, an embodiment of the present invention provides another resource indication method, including: receiving indication information sent by a network device by using a resource of a first system, where the indication information is used to indicate system resource information of a second system; and determining, by the user equipment, the system resource information based on the indication information. Therefore, the user equipment can directly determine the system resource information of the second system based on the indication information, without trying a plurality of frequencies one by one to determine the system resource information of the second system. This improves efficiency of determining the second system by the user equipment.

In a feasible implementation, the indication information includes a resource identifier corresponding to the system resource information. In a feasible solution, some or all determined candidate resource information may be numbered, and a mapping relationship between each number and candidate resource information is determined, where the candidate resource information is a center frequency of a single carrier of the second system. When the system resource information is determined from at least one piece of candidate resource information, a number corresponding to the system resource information is determined, and the network device indicates the system resource by using a number included in the indication information. Therefore, after all candidate resource information is determined, a plurality of pieces of candidate resource information that may be used for deploying the second system may be finally determined according to an actual requirement, and then the system resource information of the second system is determined from the finally determined plurality of pieces of candidate resource information.

In a feasible implementation, the indication information includes a radio channel number ARFCN corresponding to the system resource information. The network device indicates the system resource by using the ARFCN included in the indication information.

In a feasible implementation, the indication information further includes a service identifier corresponding to the system resource information. For example, if the service identifier is 0, it indicates that the second system is used for an NB-IoT service; if the service identifier is 1, it indicates that the second system is used for an MTC service: or if the service identifier is 2, it indicates that the second system is used for a URLLC service.

In a feasible implementation, the indication information is included in system information of the first system. The system information includes a master information block (Master Information Block, MIB), a plurality of system information blocks (System Information Blocks, SIBs), and the like. The network device may send the indication message by using the system information.

In a feasible implementation, the indication information is sent by using a broadcast channel of the first system.

In a feasible implementation, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

In a feasible implementation, when the indication information includes an identifier corresponding to the system resource information, the user equipment determines, based on a pre-obtained mapping relationship between the identifier and candidate resource information, the candidate resource information corresponding to the received identifier as the system resource information. In another feasible solution, when the indication information includes an ARFCN, the user equipment may determine, based on a pre-obtained mapping relationship between the ARFCN and frequency information, the frequency information corresponding to the received ARFCN as the system resource information. In another feasible solution, when the indication information is a synchronization signal, the user equipment determines, based on a pre-obtained mapping relationship between a resource used by the synchronization signal and candidate resource information, the candidate resource information corresponding to the received synchronization signal as the system resource information. A manner of determining the system resource information by the user equipment based on the indication information is not limited in this embodiment of the present invention.

In a feasible implementation, the system resource information is a center frequency of a carrier of the second system: and the center frequency of the carrier of the second system is in a range separated from an integer multiple of a preset frequency by a preset threshold. Optionally, the preset threshold is half a spacing between subcarriers of the second system or half a spacing between subcarriers of the first system. The integer multiple of the preset frequency is a frequency used by the user equipment to access the first system. Therefore, when the center frequency of the carrier of the second system is determined, the center frequency of the carrier of the second system is preferably deployed in the range separated from the integer multiple of the preset frequency by the preset threshold, so that the user equipment can access the second system.

In a feasible implementation, the system resource information is a center frequency of a carrier of the second system; and the center frequency of the carrier of the second system is a frequency location that has a minimum offset from an integer multiple of a preset frequency, and the offset is an integer multiple of a preset minimum frequency width. Therefore, the center frequency of the carrier of the second system can approach the integer multiple of the preset frequency maximally, so that the user equipment can access the second system.

According to a third aspect, an embodiment of the present invention provides a resource deployment method, including: determining, based on resource block information of a plurality of resource blocks included in a first system and information of a single carrier in a second system, at least one piece of candidate resource information of the single carrier deployed in the first system; and determining system resource information of the second system from the at least one piece of candidate resource information; where the resource block information includes a frequency range of each resource block in the plurality of resource blocks, and the information of the single carrier includes a second frequency width of the single carrier. The system resource information of the second system is determined based on the resource block information of the first system and the second frequency width of the second system. Therefore, when a spacing between subcarriers of the first system is different from a spacing between subcarriers of the second system, a function of deploying the second system in the first system can also be implemented.

In a feasible implementation, a first frequency width of each resource block in the first system is different from the second frequency width. Therefore, when a spacing between subcarriers of the first system is different from a spacing between subcarriers of the second system, the function of deploying the second system in the first system can also be implemented.

In a feasible implementation, the determining, based on resource block information of a plurality of resource blocks included in a first system and information of a single carrier in a second system, at least one piece of candidate resource information of the single carrier deployed in the first system includes: determining the first frequency width of each resource block based on the resource block information of the plurality of resource blocks included in the first system; determining, based on the first frequency width and the information of the single carrier in the second system, a quantity of resource blocks occupied by the single carrier of the second system in the first system; and selecting, from the plurality of resource blocks, a quantity of target resource blocks same as the quantity of the resource blocks, and determining candidate resource information of the single carrier deployed on the target resource blocks.

The determining, based on the first frequency width and the information of the single carrier in the second system, a quantity of resource blocks occupied by the single carrier of the second system in the first system includes: determining a numeric value obtained through calculation by rounding up a ratio of the second frequency width to the first frequency width, as the quantity of the resource blocks occupied by the single carrier in the first system. In this calculation method, the single carrier of the second system can be allowed to occupy a minimum quantity of resource blocks in the first system, and therefore waste of resource blocks is not caused in the first system.

In a feasible implementation, the candidate resource information is a center frequency of the single carrier of the second system; and the center frequency of the single carrier is in a range separated from an integer multiple of a preset frequency by a preset threshold. Optionally, the preset threshold is half a spacing between subcarriers of the second system or half a spacing between subcarriers of the first system. The integer multiple of the preset frequency is a frequency used by the user equipment to access the first system. Therefore, when the center frequency of the carrier of the second system is determined, the center frequency of the carrier of the second system is preferably deployed in the range separated from the integer multiple of the preset frequency by the preset threshold, so that the user equipment can access the second system.

In a feasible implementation, the candidate resource information is a center frequency of the single carrier of the second system; and the center frequency of the single carrier is a frequency location that has a minimum offset from an integer multiple of a preset frequency, and the offset is an integer multiple of a preset minimum frequency width. Therefore, the center frequency of the carrier of the second system can approach the integer multiple of the preset frequency maximally, so that the user equipment can access the second system.

In a feasible implementation, the selecting, from the plurality of resource blocks, a quantity of target resource blocks same as the quantity of the resource blocks, and determining candidate resource information of the single carrier deployed on the target resource blocks includes: determining, in a frequency range of the target resource blocks, at least one integer-multiple frequency satisfying an integer multiple of the preset frequency: searching for a target center frequency that is separated from each integer-multiple frequency by a minimum offset, where the target center frequency is a center frequency of a target frequency band whose frequency width is the second frequency width in the frequency range of the target resource blocks and determining the minimum offset between each integer-multiple frequency and the target center frequency as a first offset corresponding to each integer-multiple frequency: and determining a minimum first offset from the first offset corresponding to each integer-multiple frequency, and determining a location of a target frequency band in which a target center frequency corresponding to the minimum first offset is located, as the candidate resource information of the single carrier. Therefore, the center frequency of the carrier of the second system can approach the integer multiple of the preset frequency maximally, so that the user equipment can access the second system.

In a feasible implementation, the method includes: sending indication information by using a resource of the first system, where the indication information is used to indicate the system resource information, so that a device receiving the indication information determines the system resource information based on the indication information.

In a feasible implementation, the system resource information is information about a resource occupied by the second system in the first system.

In a feasible implementation, the indication information includes a resource identifier corresponding to the system resource information. In a feasible solution, some or all determined candidate resource information may be numbered, and a mapping relationship between each number and candidate resource information is determined, where the candidate resource information is a center frequency of the single carrier of the second system. When the system resource information is determined from the at least one piece of candidate resource information, a number corresponding to the system resource information is determined, and the network device indicates the system resource by using a number included in the indication information. Therefore, after all candidate resource information is determined, a plurality of pieces of candidate resource information that may be used for deploying the second system may be finally determined according to an actual requirement, and then the system resource information of the second system is determined from the finally determined plurality of pieces of candidate resource information.

In a feasible implementation, the indication information includes a radio channel number ARFCN corresponding to the system resource information. The network device indicates the system resource by using the ARFCN included in the indication information.

In a feasible implementation, the indication information further includes a service identifier corresponding to the system resource information. For example, if the service identifier is 0, it indicates that the second system is used for an NB-IoT service; if the service identifier is 1, it indicates that the second system is used for an MTC service; or if the service identifier is 2, it indicates that the second system is used for a URLLC service.

In a feasible implementation, the indication information is included in system information of the first system. The system information includes a master information block (Master Information Block, MIB), a plurality of system information blocks (System Information Blocks, SIBs), and the like. The network device may send the indication message by using the system information.

In a feasible implementation, the indication information is sent by using a broadcast channel of the first system.

In a feasible implementation, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

According to a fourth aspect, an embodiment of the present invention provides a network device, including:

an obtaining unit, configured to obtain system resource information of a second system; and a sending unit, configured to send indication information by using a resource of a first system, where the indication information is used to indicate the system resource information, so that a device receiving the indication information determines the system resource information based on the indication information.

The network device provided by the fourth aspect of the embodiments of the present invention is configured to perform the resource indication method provided by the first aspect of the present invention. For details, refer to descriptions of the first aspect of the embodiments of the present invention. Details are not described again herein.

In a possible design, a structure of the network device includes a processor and a transceiver, where the processor is configured to perform the resource indication method provided by the first aspect of the present invention. Optionally, the network device may further include a memory, where the memory is configured to store application program code supporting the network device in performing the foregoing method, and the processor is configured to execute an application program stored in the memory.

According to a fifth aspect, an embodiment of the present invention provides user equipment, including:

a receiving unit, configured to receive indication information sent by a network device by using a resource of a first system, where the indication information is used to indicate system resource information of a second system; and a determining unit, configured to determine the system resource information based on the indication information.

The network device provided by the fifth aspect of the embodiments of the present invention is configured to perform the resource indication method provided by the second aspect of the present invention. For details, refer to descriptions of the second aspect of the embodiments of the present invention. Details are not described again herein.

In a possible design, a structure of the user equipment includes a processor and a transceiver, where the processor is configured to perform the resource indication method provided by the second aspect of the present invention. Optionally, the user equipment may further include a memory, where the memory is configured to store application program code supporting the user equipment in performing the foregoing method, and the processor is configured to execute an application program stored in the memory.

According to a sixth aspect, an embodiment of the present invention provides a deployment device, including:

a first determining unit, configured to determine, based on resource block information of a plurality of resource blocks included in a first system and information of a single carrier in a second system, at least one piece of candidate resource information of the single carrier deployed in the first system; and a second determining unit, configured to determine system resource information of the second system from the at least one piece of candidate resource information; where the resource block information includes a frequency range of each resource block in the plurality of resource blocks, and the information of the single carrier includes a second frequency width of the single carrier.

The deployment device provided by the sixth aspect of the embodiments of the present invention is configured to perform the system deployment method provided by the third aspect of the present invention. For details, refer to descriptions of the third aspect of the embodiments of the present invention. Details are not described again herein.

According to a seventh aspect, an embodiment of the present invention provides a computer storage medium, configured to store a computer software instruction used by the foregoing network device, where the computer software instruction is used to execute a program designed in the foregoing aspect.

In a possible design, a structure of the deployment device includes a processor and a transceiver, where the processor is configured to perform the system deployment method provided by the third aspect of the present invention. Optionally, the deployment device may further include a memory, where the memory is configured to store application program code supporting the deployment device in performing the foregoing method, and the processor is configured to execute an application program stored in the memory.

According to an eighth aspect, an embodiment of the present invention provides a computer storage medium, configured to store a computer software instruction used by the user equipment, where the computer software instruction is used to execute a program designed in the foregoing aspect.

According to a ninth aspect, an embodiment of the present invention provides a computer storage medium, configured to store a computer software instruction used by the deployment device, where the computer software instruction is used to execute a program designed in the foregoing aspect.

In the embodiments of the present invention, names of the network device, the user equipment, and the deployment device do not constitute a limitation to the devices. In actual implementations, the devices may appear with other names. The devices shall fall within the scope of the claims of the present invention and equivalent technologies thereof so long as functions of the devices are similar to the present invention.

In the embodiments of the present invention, the indication information is sent by using the resource of the first system, and the indication information is used to indicate the system resource information, so that the device receiving the indication information determines the system resource information based on the indication information. Therefore, the user equipment receiving the indication information can directly determine the system resource information of the second system based on the indication information, without trying a plurality of frequencies one by one to determine the system resource information of the second system. This improves efficiency of determining the second system by the user equipment.

The aspects of the present invention or other aspects are clearer and more comprehensible in the following description of embodiments.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Network architectures and service scenarios described in the embodiments of the present invention are intended to describe the technical solutions of the embodiments of the present invention more clearly, and do not constitute any limitation to the technical solutions provided by the embodiments of the present invention. A person of ordinary skill in the art may know that, with evolution of a network architecture and emergence of a new service scenario, the technical solutions provided by the embodiments of the present invention are also applicable to similar technical problems. It should be noted that, the terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. In addition, in the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
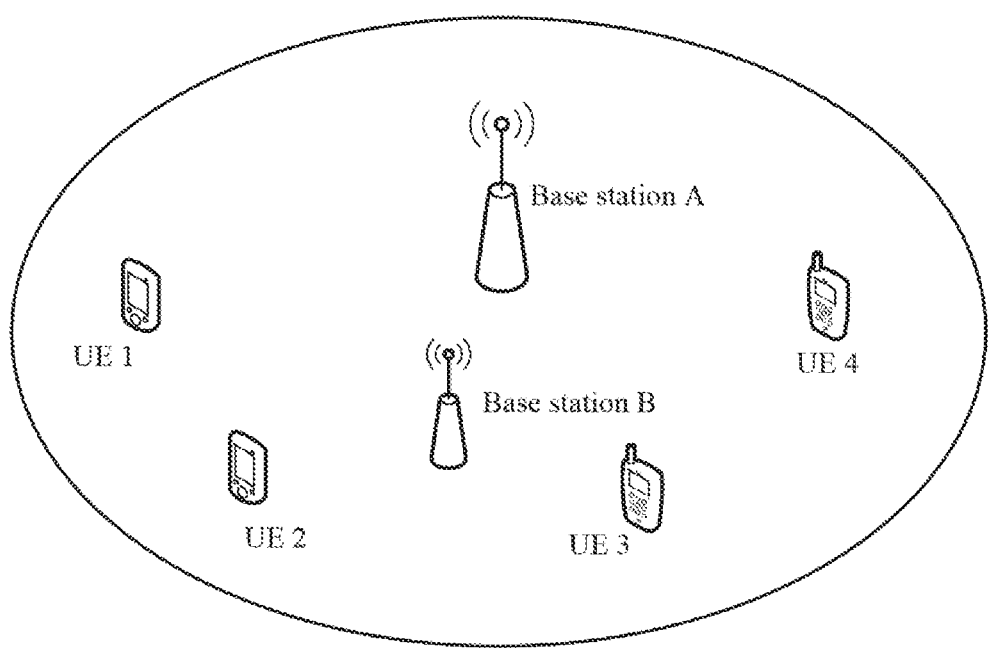
FIG. 1 is a possible network architectural diagram according to an embodiment of the present invention.

For ease of understanding the present invention, the following first describes a possible architectural diagram to which the embodiments of the present invention are applicable. Referring to FIG. 1, the shown architectural diagram is a diagram of a network device for deploying a second system in a first system, and includes a network device A of the first system, and a network device B of the second system. A plurality of user equipments (User Equipment, UE) within coverage of the network device A, for example, UE 1, UE 2, . . . , are also shown in FIG. 1. The first system may be a Global System for Mobile Communications (Global System for Mobile Communications, GSM), and the corresponding network device A is a base station in the GSM system; or the first system may be a Universal Mobile Telecommunications System (Universal Mobile Telecommunications System, UMTS), and the corresponding network device A is a base station (NodeB) in the UMTS system; or the first system may be an LTE system, and the corresponding network device A is an evolved NodeB (NodeB) in the UMTS system. The foregoing is merely an example. A range of the first system, for example, a future 5G communications system, is not limited in the embodiments of the present invention. The second system is a narrowband system. A bandwidth of the second system is less than a bandwidth of the first system. Therefore, a function of deploying the second system in the first system can be implemented. For example, the second system may include but is not limited to an NB-IoT system.

Assuming that the first system is the LTE system and the second system is the NB-IoT system, a system bandwidth of the LTE system is 20 MHz, including several physical resource blocks (physical resource block, PRB), where each resource block includes 12 subcarriers in frequency domain, and a spacing between subcarriers is 15 kHz; and a carrier of the NB-IoT system includes 12 subcarriers, and a spacing between subcarriers is 15 kHz. When the NB-IoT system is deployed in the LTE system, a single carrier of the second system may occupy one PRB of the first system, and a center frequency of the single carrier is the same as a center frequency of an occupied resource block. Therefore, a function of deploying the second system in the first system is implemented.

However, even after the second system is deployed in the first system, when user equipment needs to perform communication by using the NB-IoT system, the user equipment needs to blindly search for the NB-IoT system. To be specific, to determine a carrier frequency of the NB-IoT system, the user equipment needs to try a plurality of frequencies one by one in the LTE system. This reduces efficiency of determining the second system by the user equipment. Therefore, an embodiment of the present invention provides a resource indication method, including: obtaining system resource information of a second system; and sending indication information by using a resource of a first system, where the indication information is used to indicate the system resource information, so that a device receiving the indication information determines the system resource information based on the indication information. Therefore, user equipment receiving the indication information can directly determine the system resource information of the second system based on the indication information, without trying a plurality of frequencies one by one to determine the system resource information of the second system. This improves efficiency of determining the second system by the user equipment.

In addition, not all spacings between subcarriers of the second system are the same as spacings between subcarriers of the first system. Therefore, a center frequency of a single carrier of the second system is not definitely a center frequency of an occupied resource block. Therefore, when a spacing between subcarriers of the second system is different from a spacing between subcarriers of the first system, a problem about how to deploy the second system in the first system still exists. Therefore, an embodiment of the present invention provides a system deployment method, including: determining, based on resource block information of a plurality of resource blocks included in a first system and information of a single carrier in a second system, at least one piece of candidate resource information of the single carrier deployed in the first system; and determining system resource information of the second system from the at least one piece of candidate resource information: where the resource block information includes a frequency range of each resource block in the plurality of resource blocks, and the information of the single carrier includes a second frequency width of the single carrier. The system resource information of the second system is determined based on the resource block information of the first system and the second frequency width of the second system. Therefore, when a spacing between subcarriers of the first system is different from a spacing between subcarriers of the second system, a function of deploying the second system in the first system can also be implemented.

The user equipment in the embodiments of the present invention may not only include a terminal including an electronic device having a communication function such as a mobile phone, a tablet computer (Pad), a smart wearable device (for example, a watch, or a band), but also include an electronic device such as a motor vehicle, a non-motor vehicle, another communications device on a road, or a smart appliance.

The network device in the embodiments of the present invention may include but is not limited to a base station device, a roadside unit, and a network-side device in future 5G communication.

The deployment device in the embodiments of the present invention may include but is not limited to a base station device, a roadside unit, and a network-side device in future 5G communication, and an electronic device having a communication function.

Figure 2:
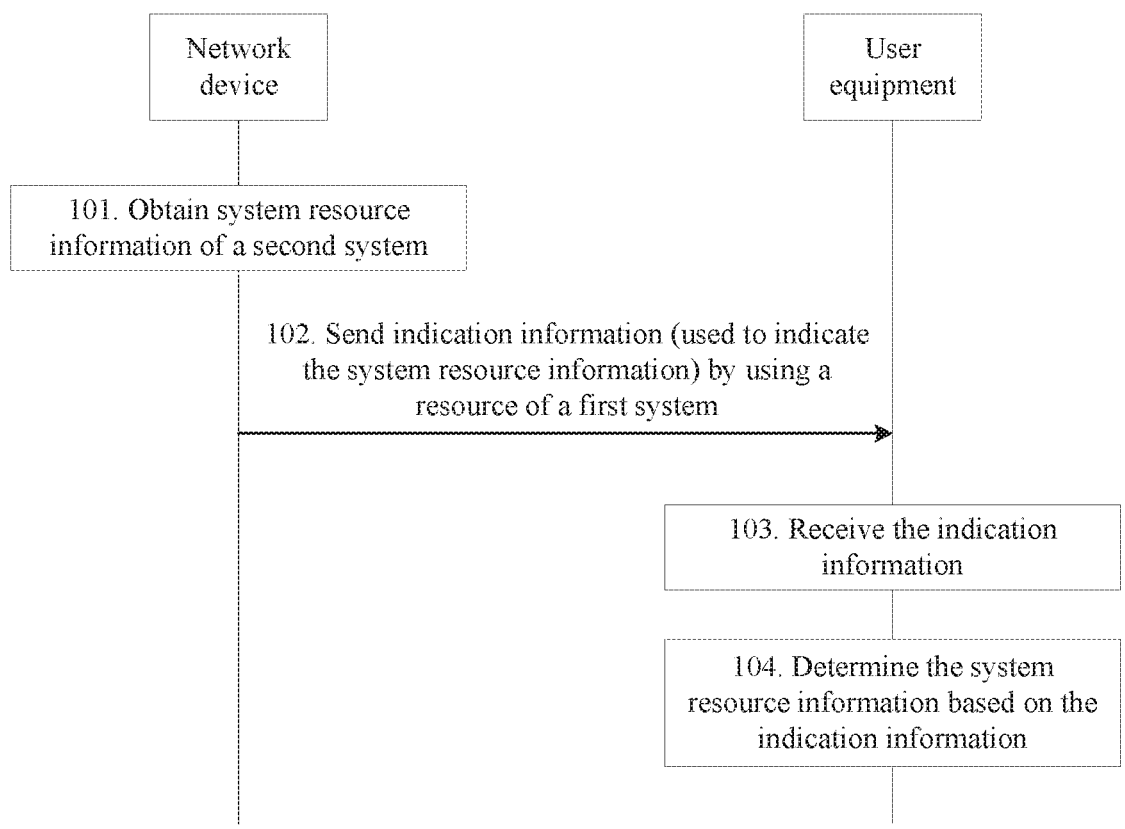
FIG. 2 is a schematic flowchart of a resource indication method according to an embodiment of the present invention.

Referring to FIG. 2, FIG. 2 is a schematic flowchart of a resource indication method according to an embodiment of the present invention. A specific procedure of the resource indication method in the embodiment shown in FIG. 2 is described from perspectives of both a user equipment and a network device, where the network device is a network device in a first system. The method may include the following steps.

101. Obtain system resource information of a second system.

Specifically, a network device obtains the system resource information of the second system, where the system resource information may include but is not limited to location information of a frequency domain resource or a time domain resource of the second system. The second system may be used by user equipment to receive or transmit channel information.

Optionally, the system resource information is information about a resource occupied by the second system in the first system. In a first feasible solution of step 101, before the network device obtains the system resource information of the second system, the network device may further determine information about a resource occupied by the second system in the first system, and specifically, the network device determines, based on resource block information of a plurality of resource blocks included in the first system and information of a single carrier in the second system, at least one piece of candidate resource information of the single carrier deployed in the first system. That the network device obtains the system resource information of the second system is specifically implemented by determining the system resource information of the second system from the at least one piece of candidate resource information.

Figure 3:
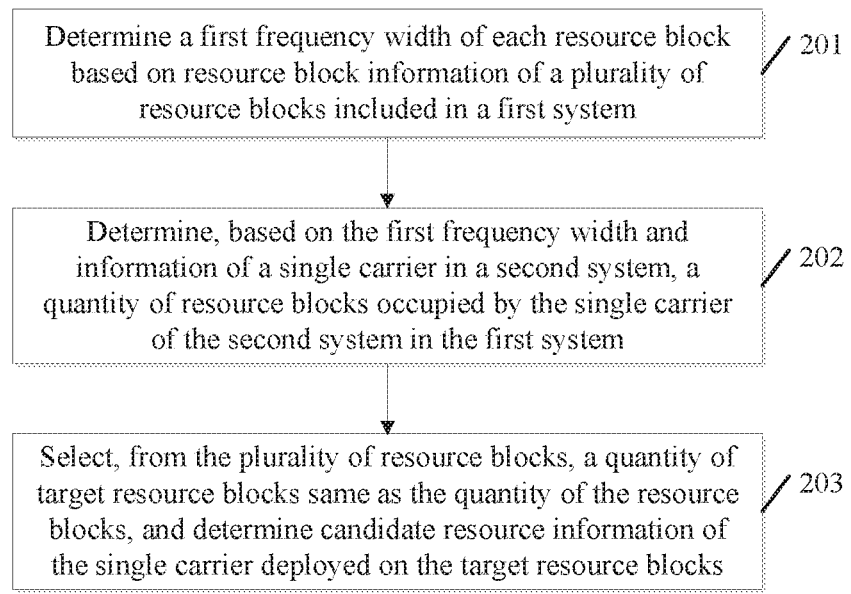
FIG. 3 is a schematic flowchart of a system deployment method according to an embodiment of the present invention.

In the first feasible solution of step 101, the network device determines, based on the resource block information of the plurality of resource blocks included in the first system and the information of the single carrier in the second system, the at least one piece of candidate resource information of the single carrier deployed in the first system. The resource block information includes a frequency range of each resource block in the plurality of resource blocks, and the information of the single carrier includes a second frequency width of the single carrier. For details, refer to FIG. 3. FIG. 3 is a schematic flowchart of a resource deployment method according to an embodiment of the present invention, where the resource deployment method includes steps 201 to 203.

201. Determine a first frequency width of each resource block based on resource block information of a plurality of resource blocks included in a first system.

Specifically, the network device determines the first frequency width of each resource block based on the resource block information of the plurality of resource blocks included in the first system. In this embodiment of the present invention, a resource included in the first system is a frequency domain resource, and a total bandwidth of the frequency domain resource of the first system is preset. The first system includes a quantity of resource blocks, and a frequency width of each resource block is the first frequency width. For example, a bandwidth of the first system is 20 MHz, and the first frequency width of each resource block is 360 kHz. In this embodiment of the present invention, the resource block information includes a frequency range of each resource block in the plurality of resource blocks, where the frequency range is used to indicate a start frequency and an end frequency of each resource block. Therefore, the first frequency width of each resource block may be determined by using the frequency range of each resource block.

Optionally, the resource block information may further include the first frequency width of each resource block. Therefore, the network device may directly determine the first frequency width based on the resource block information.

202. Determine, based on the first frequency width and information of a single carrier in a second system, a quantity of resource blocks occupied by the single carrier of the second system in the first system.

Specifically, the network device determines, based on the first frequency width and the information of the single carrier in the second system, the quantity of the resource blocks occupied by the single carrier of the second system in the first system. The information of the single carrier includes a second frequency width of the single carrier. The network device determines, based on the first frequency width of each resource block in the first system and the second frequency width of the single carrier in the second system, the quantity of the resource blocks occupied by the single carrier of the second system. In a feasible solution, when the second frequency width is greater than the first frequency width, the network device performs determining in a manner in which the second frequency width can be satisfied and the quantity of the resource blocks occupied in the first system is relatively small. Optionally, the network device determines a numeric value obtained through calculation by rounding up a ratio of the second frequency width to the first frequency width, as the quantity of the resource blocks occupied by the single carrier in the first system. For example, the second frequency width is $W_2$, the first frequency width is $W_1$, and the quantity of the occupied resource blocks is $$n = \left\lceil \frac{W_2}{W_1} \right\rceil.$$

Therefore, the quantity of the resource blocks occupied by the single carrier of the second system in the first system can be minimized, and waste of resources caused when the second system is deployed in the first system can be avoided.

It should be noted that, the single carrier of the second system is one of carriers in the second system. In a feasible solution, the second system is a system including only one carrier, or the second system is a system including a plurality of carriers. For example, the second system includes two aggregated carriers. In step 202, the network device determines the quantity of the resource blocks occupied by the single carrier of the second system. It may be understood that, when the second system includes a plurality of carriers, the network device may determine, based on the quantity of carriers included in the second system, a quantity of resource blocks occupied by all the carriers in the second system.

203. Select, from the plurality of resource blocks, a quantity of target resource blocks same as the quantity of the resource blocks, and determine candidate resource information of the single carrier deployed on the target resource blocks.

Specifically, the network device selects, from the plurality of resource blocks, the target resource blocks whose quantity is the same as the quantity of the resource blocks, and determines the candidate resource information of the single carrier deployed on the target resource blocks. Optionally, the candidate resource information includes information about a deployment location of the single carrier on the target resources.

When the second frequency width is equal to the first frequency width multiplied by N, where N is a positive integer greater than 0, the quantity of the resource blocks occupied by the single carrier of the second system may be determined as N in step 202. Because the second frequency width is equal to the first frequency width multiplied by N, the carrier of the second system occupies all resources of the occupied resource blocks.

When the second frequency width is less than the first frequency width and the second frequency width is greater than the first frequency width, a plurality of deployment modes are available. Optionally, on condition that a frequency range of the single carrier is in a frequency range of the occupied target resource blocks, a center frequency of the single carrier is in a range separated from an integer multiple of a preset frequency by a preset threshold. For example, the center frequency of the single carrier is in a range separated from an integer multiple of 100 kHz by 15 kHz; or the center frequency of the single carrier is a frequency location that has a minimum offset from an integer multiple of a preset frequency, where the offset is an integer multiple of a preset minimum frequency width. The preset threshold is half a spacing between subcarriers of the second system or half a spacing between subcarriers of the first system. It should be noted that, the subcarriers of the second system are included in the carrier of the second system, and the subcarriers of the first system are included in the carrier of the first system. Regardless of the subcarriers of the first system or the second system, it may be assumed that a frequency width of a carrier is 360 kHz, and the carrier includes 12 subcarriers. In this case, a spacing between subcarriers is 30 kHz.

In a feasible solution, the integer multiple of the preset frequency is a frequency used by the user equipment to access the first system. For example, in an LTE system, the user equipment searches for the first system on a frequency that is an integer multiple of 100 kHz. Therefore, when the center frequency of the carrier of the second system is determined, the center frequency of the carrier of the second system is preferably deployed in the range separated from the integer multiple of the preset frequency by the preset threshold, or the center frequency of the carrier of the second system approaches the integer multiple of the preset frequency maximally, so that the user equipment can access the second system.

For example, when the second frequency width is greater than the first frequency width, it is assumed that the first frequency width is 180 kHz, and the second frequency width is 210 kHz, and the carrier of the first system and the carrier of the second system each include 12 subcarriers, and the preset threshold is 15 kHz. In an implementation of step 202, the quantity of the resource blocks occupied by the single carrier of the second system in the first system may be determined as $$n = \left\lceil \frac{W_2}{W_1} \right\rceil = \left\lceil \frac{210}{180} \right\rceil = 2.$$

Figure 4A:
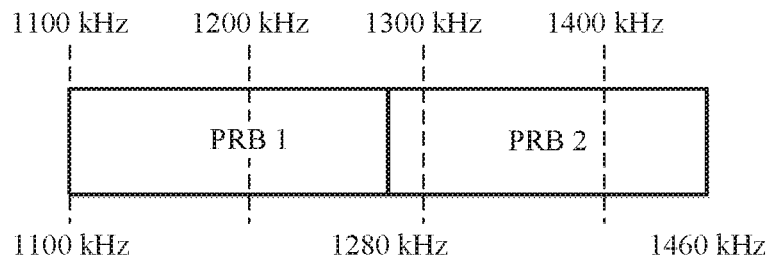
FIG. 4a is a schematic diagram of a frequency of a resource block according to an embodiment of the present invention.

Based on the quantity of the occupied resource blocks, which is 2, two resource blocks PRB 1 and PRB 2 are selected from the resource blocks of the first system as the target resource blocks. Based on the resource block information, the frequency range of the target resource blocks is determined as 1100 kHz to 1460 kHz. As shown in FIG. 4a, the candidate resource information of the single carrier is determined from the target resource blocks shown in FIG. 4a.

A. If the single carrier is deployed on condition that the center frequency of the single carrier is in a range separated from an integer multiple of 100 kHz by 15 kHz, as can be seen, in a range of 1100 kHz to 1460 kHz, an integer multiple of 100 kHz includes 1100 kHz, 1200 kHz, 1300 kHz, or 1400 kHz, and a range in which the center frequency of the single carrier may be deployed, corresponding to each integer-multiple frequency, is as follows:

A range corresponding to 1100 kHz is 1085 kHz to 1115 kHz. When the center frequency of the single carrier is in the range of 1085 kHz to 1115 kHz, the frequency range of the single carrier exceeds the frequency range of the target resource blocks. Therefore, the center frequency of the single carrier cannot be deployed in 1085 kHz to 1115 kHz.

A range corresponding to 1200 kHz is 1185 kHz to 1215 kHz. Likewise, it may be determined that the center frequency of the single carrier may be deployed in a range of 1205 kHz to 1215 kHz.

A range corresponding to 1300 kHz is 1285 kHz to 1315 kHz. Likewise, it may be determined that the center frequency of the single carrier may be deployed in a range of 1285 kHz to 1315 kHz.

A range corresponding to 1400 kHz is 1385 kHz to 1415 kHz. Likewise, it may be determined that the center frequency of the single carrier cannot be deployed in 1385 kHz to 1415 kHz.

In a feasible solution, the candidate resource information is the center frequency of the single carrier of the second system. In the examples, the candidate resource information is information of any frequency in the frequency ranges of 1205 kHz to 1215 kHz, and 1285 kHz to 1315 kHz.

B. If the center frequency of the single carrier is a frequency location that has a minimum offset from an integer multiple of 100 kHz, where the offset is an integer multiple of a preset minimum frequency width, it is assumed that the preset minimum frequency width is 1 kHz. As can be seen, in a range of 1100 kHz to 1460 kHz; an integer multiple of 100 kHz includes 1100 kHz, 1200 kHz, 1300 kHz, or 1400 kHz. In order that the single carrier is deployed on the PRB 1 and the PRB 2, a minimum offset of the center frequency of the single carrier that may be deployed, corresponding to each integer-multiple frequency, is as follows:

A minimum offset corresponding to 1100 kHz is a 105 kHz rightward offset; a minimum offset corresponding to 1200 kHz is a 5 kHz rightward offset; a minimum offset corresponding to 1300 kHz is 0 kHz; and a minimum offset corresponding to 1400 kHz is a 45 kHz leftward offset.

In a feasible solution, the candidate resource information is the center frequency of the single carrier of the second system. In the examples, the candidate resource information is frequency information of 1300 kHz.

For example, when the second frequency width is less than the first frequency width, it is assumed that the first frequency width is 360 kHz, and the second frequency width is 180 kHz, and the carrier of the first system and the carrier of the second system each include 12 subcarriers, and the preset threshold is 15 kHz. In an implementation of step 202, the quantity of the resource blocks occupied by the single carrier of the second system in the first system may be determined as $$n = \left\lceil \frac{W_2}{W_1} \right\rceil = \left\lceil \frac{180}{360} \right\rceil = 1.$$

Figure 4B:
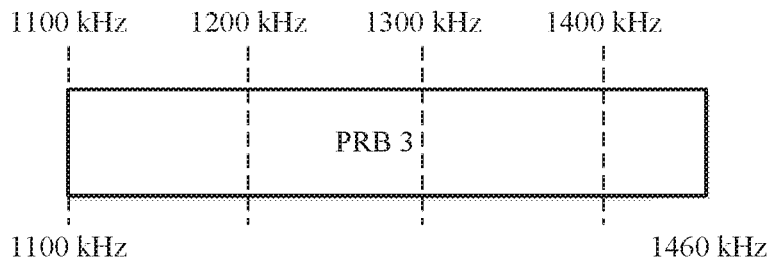
FIG. 4b is a schematic diagram of a frequency of another resource block according to an embodiment of the present invention.

Based on the quantity of the occupied resource blocks, which is 1, one resource block PRB 3 is selected from the resource blocks of the first system as the target resource block. Based on the resource block information, the frequency range of the target resource block is determined as 1100 kHz to 1460 kHz. As shown in FIG. 4b, the candidate resource information of the single carrier is determined from the target resource block shown in FIG. 4b.

C. If the single carrier is deployed on condition that the center frequency of the single carrier is in a range separated from an integer multiple of 100 kHz by 15 kHz, as can be seen, in a range of 1100 kHz to 1460 kHz, an integer multiple of 100 kHz includes 1100 kHz, 1200 kHz, 1300 kHz, or 1400 kHz, and a range in which the center frequency of the single carrier may be deployed, corresponding to each integer-multiple frequency, is as follows:

A range corresponding to 1100 kHz is 1085 kHz to 1115 kHz. When the center frequency of the single carrier is in the range of 1085 kHz to 1115 kHz, the frequency range of the single carrier exceeds the frequency range of the target resource block. Therefore, the center frequency of the single carrier cannot be deployed in 1085 kHz to 1115 kHz.

A range corresponding to 1200 kHz is 1185 kHz to 1215 kHz. Likewise, it may be determined that the center frequency of the single carrier may be deployed in a range of 1190 kHz to 1215 kHz.

A range corresponding to 1300 kHz is 1285 kHz to 1315 kHz. Likewise, it may be determined that the center frequency of the single carrier may be deployed in a range of 1285 kHz to 1315 kHz.

A range corresponding to 1400 kHz is 1385 kHz to 1415 kHz. Likewise, it may be determined that the center frequency of the single carrier cannot be deployed in 1385 kHz to 1415 kHz.

In a feasible solution, the candidate resource information is the center frequency of the single carrier of the second system. In the examples, the candidate resource information is information of any frequency in the frequency ranges of 1190 kHz to 1215 kHz, and 1285 kHz to 1315 kHz.

D. If the center frequency of the single carrier is a frequency location that has a minimum offset from an integer multiple of 1100 kHz, where the offset is an integer multiple of a preset minimum frequency width, it is assumed that the preset minimum frequency width is 1 kHz. As can be seen, in a range of 1100 kHz to 1460 kHz, an integer multiple of 100 kHz includes 1100 kHz, 1200 kHz, 1300 kHz. or 1400 kHz. In order that the single carrier is deployed on the PRB 3, a minimum offset of the center frequency of the single carrier that may be deployed, corresponding to each integer-multiple frequency, is as follows:

A minimum offset corresponding to 1100 kHz is a 90 kHz rightward offset; a minimum offset corresponding to 1200 kHz is 0 kHz: a minimum offset corresponding to 1300 kHz is 0 kHz; and a minimum offset corresponding to 1400 kHz is a 30 kHz leftward offset.

In a feasible solution, the candidate resource information is the center frequency of the single carrier of the second system. In the examples, the candidate resource information is frequency information of 1200 kHz and 1300 kHz.

In a feasible implementation of step 203, the network device may further implement this step in the following manner: determine, in the frequency range of the target resource blocks, at least one integer-multiple frequency satisfying an integer multiple of the preset frequency, search for a target center frequency that is separated from each integer-multiple frequency by a minimum offset, where the target center frequency is a center frequency of a target frequency band whose frequency width is the second frequency width in the frequency range of the target resource blocks, and determine the minimum offset between each integer-multiple frequency and the target center frequency as a first offset corresponding to each integer-multiple frequency; and determine a minimum first offset from the first offset corresponding to each integer-multiple frequency, and determine a location of a target frequency band in which a target center frequency corresponding to the minimum first offset is located, as the candidate resource information of the single carrier.

In a feasible solution, the integer multiple of the preset frequency is a frequency used by the user equipment to access the first system. For example, in an LTE system, the user equipment searches for the first system on a frequency that is an integer multiple of 100 kHz. Therefore, when the center frequency of the carrier of the second system is determined, the center frequency of the carrier of the second system is preferably deployed in the range separated from the integer multiple of the preset frequency by the preset threshold, so that the user equipment can access the second system.

Further, in the manner shown in FIG. 3, it is determined that the candidate resource information is candidate resource information on a target resource block. In a feasible solution, the network device may determine a plurality of target resource blocks from the first system, and determine at least one piece of candidate resource information from the target resource blocks. However, it may be understood that, the preset frequency used in the manner shown in FIG. 3 is 100 kHz. As can be seen, the preset frequency is less than a frequency width of a target resource block. Therefore, a frequency corresponding to an integer multiple of the preset frequency may be found in a frequency range of each target resource block. It may be understood that, when the preset frequency is greater than a frequency width of a target resource block, a frequency corresponding to an integer multiple of the preset frequency possibly cannot be found in a frequency range of the target resource block, and therefore candidate resource information cannot be determined either. Therefore, the network device may select to determine candidate resource information from a target resource block on which there is a frequency corresponding to the integer multiple of the preset frequency.

In the first feasible solution of step 101, the network device obtains the system resource information of the second system, and specifically determines the system resource information of the second system from the at least one piece of candidate resource information. For example, the system resource information of the second system is selected from the determined plurality of pieces of candidate resource information. In a feasible solution, the network device may preferentially select, from the determined at least one piece of candidate resource information, an integer multiple of the preset frequency as the system resource information of the second system, for example, preferentially select candidate resource information of an integer multiple of 100 kHz. It should be noted that, the candidate resource information is center frequency information of the single carrier of the second system. However, when the quantity of carriers in the second system is 1, one piece of candidate resource information is selected from the plurality of pieces of candidate resource information as the system resource information of the second system. When the quantity of carriers in the second system is more than 1, for example, 3, three pieces of candidate resource information are selected from the plurality of pieces of candidate resource information as the system resource information of the second system, and no overlapping frequency exists between frequency ranges corresponding to the determined three pieces of candidate resource information.

Figure 5:
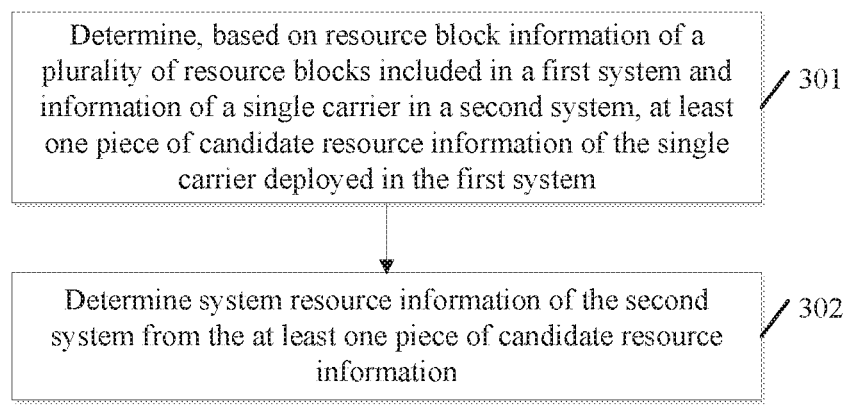
FIG. 5 is a schematic flowchart of another system deployment method according to an embodiment of the present invention.

In a second feasible solution of step 101, the network device may directly obtain the system resource information of the second system, where the system resource information of the second system is determined by another device. In this embodiment of the present invention, the system resource information of the second system may be determined by a deployment device, where the deployment device performs a resource deployment method. As shown in FIG. 5, the resource deployment method includes step 301 and step 302.

301. Determine, based on resource block information of a plurality of resource blocks included in a first system and information of a single carrier in a second system, at least one piece of candidate resource information of the single carrier deployed in the first system.

Specifically, the deployment device determines, based on the resource block information of the plurality of resource blocks included in the first system and the information of the single carrier in the second system, the at least one piece of candidate resource information of the single carrier deployed in the first system. In a feasible solution, also referring to FIG. 3. FIG. 3 is a schematic flowchart of a resource deployment method according to an embodiment of the present invention, where the resource deployment method includes steps 201 to 203. A difference between the resource deployment method in the second feasible solution and the resource deployment method in the first feasible solution is as follows: The resource deployment method in the first feasible solution is performed by the network device, and the resource deployment method in the second feasible solution is performed by the deployment device different from the network device, but a specific implementation of performing the method shown in FIG. 3 by the deployment device is the same as a specific implementation of performing the method shown in FIG. 3 by the network device. Specifically:

201. Determine a first frequency width of each resource block based on resource block information of a plurality of resource blocks included in a first system.

Specifically, the deployment device determines the first frequency width of each resource block based on the resource block information of the plurality of resource blocks included in the first system. In this embodiment of the present invention, a resource included in the first system is a frequency domain resource, and a total bandwidth of the frequency domain resource of the first system is preset. The first system includes a quantity of resource blocks, and a frequency width of each resource block is the first frequency width. For example, a bandwidth of the first system is 20 MHz, and the first frequency width of each resource block is 360 kHz. In this embodiment of the present invention, the resource block information includes a frequency range of each resource block in the plurality of resource blocks, where the frequency range is used to indicate a start frequency and an end frequency of each resource block. Therefore, the first frequency width of each resource block may be determined by using the frequency range of each resource block.

Optionally, the resource block information may further include the first frequency width of each resource block. Therefore, the deployment device may directly determine the first frequency width based on the resource block information.

202. Determine, based on the first frequency width and information of a single carrier in a second system, a quantity of resource blocks occupied by the single carrier of the second system in the first system.

Specifically, the deployment device determines, based on the first frequency width and the information of the single carrier in the second system, the quantity of the resource blocks occupied by the single carrier of the second system in the first system. The information of the single carrier includes a second frequency width of the single carrier. The deployment device determines, based on the first frequency width of each resource block in the first system and the second frequency width of the single carrier in the second system, the quantity of the resource blocks occupied by the single carrier of the second system. In a feasible solution, when the second frequency width is greater than the first frequency width, the deployment device performs determining in a manner in which the second frequency width can be satisfied and the quantity of the resource blocks occupied in the first system is relatively small. Optionally, the deployment device determines a numeric value obtained through calculation by rounding up a ratio of the second frequency width to the first frequency width, as the quantity of the resource blocks occupied by the single carrier in the first system. For example, the second frequency width is $W_2$, the first frequency width is $W_1$, and the quantity of the occupied resource blocks $$n = \left\lceil \frac{W_2}{W_1} \right\rceil.$$

Therefore, the quantity of the resource blocks occupied by the single carrier of the second system in the first system can be minimized, and waste of resources caused when the second system is deployed in the first system can be avoided.

It should be noted that, the single carrier of the second system is one of carriers in the second system. In a feasible solution, the second system is a system including only one carrier, or the second system is a system including a plurality of carriers. For example, the second system includes two aggregated carriers. In step 202, the deployment device determines the quantity of the resource blocks occupied by the single carrier of the second system. It may be understood that, when the second system includes a plurality of carriers, the deployment device may determine, based on the quantity of carriers included in the second system, a quantity of resource blocks occupied by all the carriers in the second system.

203. Select, from the plurality of resource blocks, a quantity of target resource blocks same as the quantity of the resource blocks, and determine candidate resource information of the single carrier deployed on the target resource blocks.

Specifically, the deployment device selects, from the plurality of resource blocks, the target resource blocks whose quantity is the same as the quantity of the resource blocks, and determines the candidate resource information of the single carrier deployed on the target resource blocks. Optionally, the candidate resource information includes information about a deployment location of the single carrier on the target resources.

When the second frequency width is equal to the first frequency width multiplied by N, where N is a positive integer greater than 0, the quantity of the resource blocks occupied by the single carrier of the second system may be determined as N in step 202. Because the second frequency width is equal to the first frequency width multiplied by N, the carrier of the second system occupies all resources of the occupied resource blocks.

When the second frequency width is less than the first frequency width and the second frequency width is greater than the first frequency width, a plurality of deployment modes are available. Optionally, on condition that a frequency range of the single carrier is in a frequency range of the occupied target resource blocks, a center frequency of the single carrier is in a range separated from an integer multiple of a preset frequency by a preset threshold. For example, the center frequency of the single carrier is in a range separated from an integer multiple of 100 kHz by 15 kHz: or the center frequency of the single carrier is a frequency location that has a minimum offset from an integer multiple of a preset frequency, where the offset is an integer multiple of a preset minimum frequency width. The preset threshold is half a spacing between subcarriers of the second system or half a spacing between subcarriers of the first system. It should be noted that, the subcarriers of the second system are included in the carrier of the second system, and the subcarriers of the first system are included in the carrier of the first system. Regardless of the subcarriers of the first system or the second system, it may be assumed that a frequency width of a carrier is 360 kHz, and the carrier includes 12 subcarriers, and in this case, a spacing between subcarriers is 30 kHz. For a specific determining process, refer to detailed descriptions of the network device. Details are not described again herein.

302. Determine system resource information of the second system from the at least one piece of candidate resource information.

Specifically, the deployment device determines the system resource information of the second system from the at least one piece of candidate resource information. For example, the system resource information of the second system is selected from a plurality of pieces of candidate resource information that are determined by the deployment device. It should be noted that, the candidate resource information is center frequency information of the single carrier of the second system. However, when the quantity of carriers in the second system is 1, one piece of candidate resource information is selected from the plurality of pieces of candidate resource information as the system resource information of the second system. When the quantity of carriers in the second system is more than 1, for example, 3, three pieces of candidate resource information are selected from the plurality of pieces of candidate resource information as the system resource information of the second system, and no overlapping frequency exists between frequency ranges corresponding to the determined three pieces of candidate resource information.

It should be noted that, when the deployment device and the network device are not a same device, after the deployment device determines the system resource information of the second system, the deployment device notifies the system resource information of the second system to the network device, so that the network device obtains the system resource information of the second system. Therefore, the network device can obtain the system resource information of the second system.

102. Send indication information by using a resource of a first system, where the indication information is used to indicate the system resource information, so that a device receiving the indication information determines the system resource information based on the indication information.

Specifically, the network device sends the indication information by using the resource of the first system, where the indication information is used to indicate the system resource information, so that the device receiving the indication information determines the system resource information based on the indication information. Therefore, when the user equipment does not know the system resource information of the second system, the user equipment does not need to try a plurality of frequency resources one by one. To be specific, the system resource information of the second system can be determined by using the indication information. This improves efficiency of determining the second system.

Optionally, the indication information includes a resource identifier corresponding to the system resource information. In a feasible solution, some or all determined candidate resource information may be numbered, and a mapping relationship between each number and candidate resource information is determined, where the candidate resource information is the center frequency of the single carrier of the second system. When the system resource information is determined from the at least one piece of candidate resource information, a number corresponding to the system resource information is determined, and the network device indicates the system resource by using a number included in the indication information.

For example, if total candidate resource information determined in the first system includes 20 frequency locations in which the single carrier of the second system may be deployed, in a feasible solution, the network device may number the 20 frequency locations in sequence, and generate a mapping relationship between frequency locations and numbers, and the network device may indicate the system resource information by sending an indication message carrying a number. Alternatively, in another feasible solution, the network device may select 10 frequency locations from the 20 frequency locations to perform numbering in sequence, and generate another mapping relationship between frequency locations and numbers, and the network device may indicate the system resource information by sending an indication message carrying a number.

For another example, the network device determines some candidate resource information in which the carrier of the second system may be deployed, by using N mod K=0, where N is a number of some selected candidate resource information, and K is an integer greater than 0. Assuming K=2, and numbers of total preset deployment resources are 0 to 100, a number of some selected candidate deployment resource information is N mod 2=0, where N=0, 2, 4, . . . , and a frequency location corresponding to a selected number is determined: then numbers of some selected candidate resource information are numbered again, and a mapping relationship between frequency locations of some candidate resource information and numbers is generated. The network device may indicate the system resource information by sending an indication message carrying a number.

Optionally, the indication information includes a radio channel number ARFCN corresponding to the system resource information. The network device indicates the system resource by using the ARFCN included in the indication information.

Optionally, the indication information further includes a service identifier corresponding to the system resource information. For example, if the service identifier is 0, it indicates that the second system is used for an NB-IoT service; if the service identifier is 1, it indicates that the second system is used for a massive machine-type communications (Massive Machine-Type Communications, mMTC) service: or if the service identifier is 2, it indicates that the second system is used for an ultra-reliable and low-latency communications (Ultra-reliable and low-latency communications, URLLC) service.

Optionally, the indication information is included in system information of the first system. The system information includes a master information block (Master Information Block, MIB), a plurality of system information blocks (System Information Blocks, SIBs), and the like. The network device may send the indication message by using the system information.

Optionally, the indication information is sent by using a broadcast channel of the first system.

Optionally, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

It should be noted that, when the quantity of carriers in the second system is 1, the indication information sent by the network device in the first system is used to indicate the system resource information of the carrier. When the quantity of carriers in the second system is more than 1, one feasible solution is: the network device in the first system sends indication information used to indicate system resource information of one of the carriers, and a network device in the second system sends indication information used to indicate system resource information of other carriers; another feasible solution is: the network device in the first system sends indication information used to indicate system resource information of one of the carriers, and after receiving the indication information sent by the network device in the first system, the user equipment automatically determines system resource information of other carriers. Optionally, when the indication message includes an identifier corresponding to the system resource information, the user equipment may automatically determine the system resource information of the other carriers in the following manner: determining, in the candidate resource information by using a pre-obtained mapping relationship between an identifier and candidate resource information, other candidate resource information adjacent to the system resource information of the carrier indicated in the indication message, and determining the other adjacent candidate resource information as system resource information of the other carriers. It may be understood that, a quantity of the determined other carriers is the same as a quantity of pieces of other adjacent candidate resource information.

103. User equipment receives the indication information sent by a network device by using a resource of the first system, where the indication information is used to indicate the system resource information of the second system.

Specifically, the user equipment receives the indication information sent by the network device by using the resource of the first system, where the indication information is used to indicate the system resource information of the second system. For possible forms and possible sending manners of the indication information, refer to specific descriptions in step 102. Details are not described again herein.

104. The user equipment determines the system resource information based on the indication information.

Specifically, the user equipment determines the system resource information based on the indication information. In a feasible solution, when the indication information includes an identifier corresponding to the system resource information, the user equipment determines, based on a pre-obtained mapping relationship between the identifier and candidate resource information, the candidate resource information corresponding to the received identifier as the system resource information. In another feasible solution, when the indication information includes an ARFCN, the user equipment may determine, based on a pre-obtained mapping relationship between the ARFCN and frequency information, the frequency information corresponding to the received ARFCN as the system resource information. In another feasible solution, when the indication information is a synchronization signal, the user equipment determines, based on a pre-obtained mapping relationship between a resource used by the synchronization signal and candidate resource information, the candidate resource information corresponding to the received synchronization signal as the system resource information. A manner of determining the system resource information by the user equipment based on the indication information is not limited in this embodiment of the present invention.

In this embodiment of the present invention, the network device of the first system can send, by using the resource of the first system, the indication information used to indicate the system resource information of the second system. Therefore, the user equipment receiving the indication information can directly determine the system resource information of the second system based on the indication information, without trying a plurality of frequencies one by one to determine the system resource information of the second system. This improves efficiency of determining the second system by the user equipment.

The solutions of the embodiments of the present invention are mainly described above from a perspective of interaction between devices. It may be understood that, to implement the foregoing functions, each device, for example, the user equipment, the network device, or the deployment device, includes a corresponding hardware structure and/or a software module for performing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, functional units may be defined for the user equipment, the network device, the deployment device, and the like based on the foregoing methods. For example, each functional unit may be defined in a correspondence to each function, or two or more functions may be integrated into one processing unit. The integrated unit may be implemented in a form of hardware, or may be implemented in a form of a software functional unit. It should be noted that, division of units in the embodiments of the present invention is merely an example, and is only division of logical functions. Other division manners may be available in actual implementations.

Figure 6:
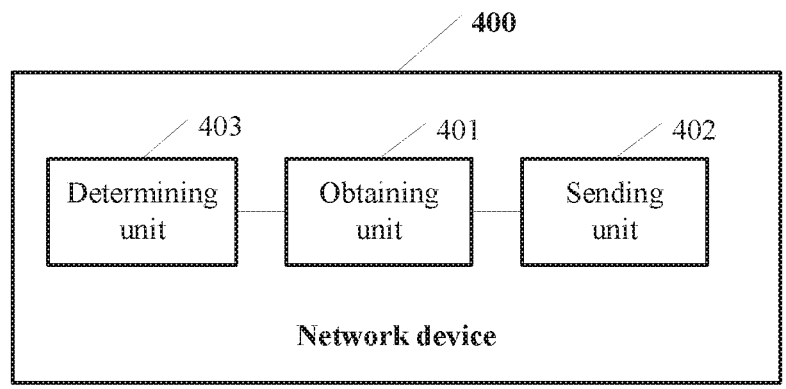
FIG. 6 is a schematic structural diagram of a network device according to an embodiment of the present invention.

Referring to FIG. 6, FIG. 6 is a schematic structural diagram of a network device according to an embodiment of the present invention. The network device in this embodiment of the present invention may be the network device provided by any embodiment in FIG. 2 to FIG. 5. As shown in FIG. 6, the network device 400 in this embodiment of the present invention may include an obtaining unit 401 and a sending unit 402. Optionally, the network device 400 further includes a determining unit 403.

The obtaining unit 401 is configured to obtain system resource information of a second system.

Optionally, the system resource information is information about a resource occupied by the second system in a first system. In a first feasible solution, before the obtaining unit 401 obtains the system resource information of the second system, the information about the resource occupied by the second system in the first system may be further determined, and specifically:

the determining unit 403 is configured to determine, based on resource block information of a plurality of resource blocks included in the first system and information of a single carrier in the second system, at least one piece of candidate resource information of the single carrier deployed in the first system; where the resource block information includes a frequency range of each resource block in the plurality of resource blocks, and the information of the single carrier includes a second frequency width of the single carrier.

In a feasible implementation of the determining unit 403, a first frequency width of each resource block in the first system is different from the second frequency width of the single carrier. The single carrier of the second system occupies a preset quantity of resource blocks in the first system, and the preset quantity is a rounded-up ratio of the second frequency width of the single carrier of the second system to a first frequency width of a resource block in the first system. For details, refer to detailed descriptions of the method embodiments shown in FIG. 2 to FIG. 5. Details are not described again herein.

The obtaining unit 401 is specifically configured to determine the system resource information of the second system from the at least one piece of candidate resource information. In a feasible implementation, the system resource information is a center frequency of a carrier of the second system; and the center frequency of the carrier of the second system is in a range separated from an integer multiple of a preset frequency by a preset threshold. Optionally, the preset threshold is half a spacing between subcarriers of the second system or half a spacing between subcarriers of the first system. In another feasible implementation, the system resource information is a center frequency of a carrier of the second system; and the center frequency of the carrier of the second system is a frequency location that has a minimum offset from an integer multiple of a preset frequency, and the offset is an integer multiple of a preset minimum frequency width.

Optionally, in a second feasible solution of the obtaining unit 401, the obtaining unit 401 may directly obtain the system resource information of the second system, where the system resource information of the second system is determined by another device. In this embodiment of the present invention, the system resource information of the second system may be determined by a deployment device, where the deployment device performs a resource deployment method.

The sending unit 402 is configured to send indication information by using a resource of the first system, where the indication information is used to indicate the system resource information, so that a device receiving the indication information determines the system resource information based on the indication information.

Optionally, the indication information includes a resource identifier corresponding to the system resource information. In a feasible solution, some or all determined candidate resource information may be numbered, and a mapping relationship between each number and candidate resource information is determined, where the candidate resource information is a center frequency of the single carrier of the second system. When the system resource information is determined from the at least one piece of candidate resource information, a number corresponding to the system resource information is determined, and the network device indicates the system resource by using a number included in the indication information. Therefore, after all candidate resource information is determined, a plurality of pieces of candidate resource information that may be used for deploying the second system may be finally determined according to an actual requirement, and then the system resource information of the second system is determined from the finally determined plurality of pieces of candidate resource information.

For example, if total candidate resource information determined in the first system includes 20 frequency locations in which the single carrier of the second system may be deployed, in a feasible solution, the network device may number the 20 frequency locations in sequence, and generate a mapping relationship between frequency locations and numbers, and the network device may indicate the system resource information by sending an indication message carrying a number. Alternatively, in another feasible solution, the network device may select 10 frequency locations from the 20 frequency locations to perform numbering in sequence, and generate another mapping relationship between frequency locations and numbers, and the network device may indicate the system resource information by sending an indication message carrying a number.

For another example, the network device determines some candidate resource information in which the carrier of the second system may be deployed, by using N mod K=0, where N is a number of some selected candidate resource information, and K is an integer greater than 0. Assuming K=2, and numbers of total preset deployment resources are 0 to 100, a number of some selected candidate deployment resource information is N mod 2=0, where N=0, 2, 4 . . . , and a frequency location corresponding to a selected number is determined; then numbers of some selected candidate resource information are numbered again, and a mapping relationship between frequency locations of some candidate resource information and numbers is generated. The network device may indicate the system resource information by sending an indication message carrying a number.

Optionally, the indication information includes a radio channel number ARFCN corresponding to the system resource information. The network device indicates the system resource by using the ARFCN included in the indication information.

Optionally, the indication information further includes a service identifier corresponding to the system resource information. For example, if the service identifier is 0, it indicates that the second system is used for an NB-IoT service; if the service identifier is 1, it indicates that the second system is used for an MTC service; or if the service identifier is 2, it indicates that the second system is used for a URLLC service.

Optionally, the indication information is included in system information of the first system. The system information includes a master information block (Master Information Block, MIB), a plurality of system information blocks (System Information Blocks, SIBs), and the like. The network device may send the indication message by using the system information.

Optionally, the indication information is sent by using a broadcast channel of the first system.

Optionally, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

Figure 7:
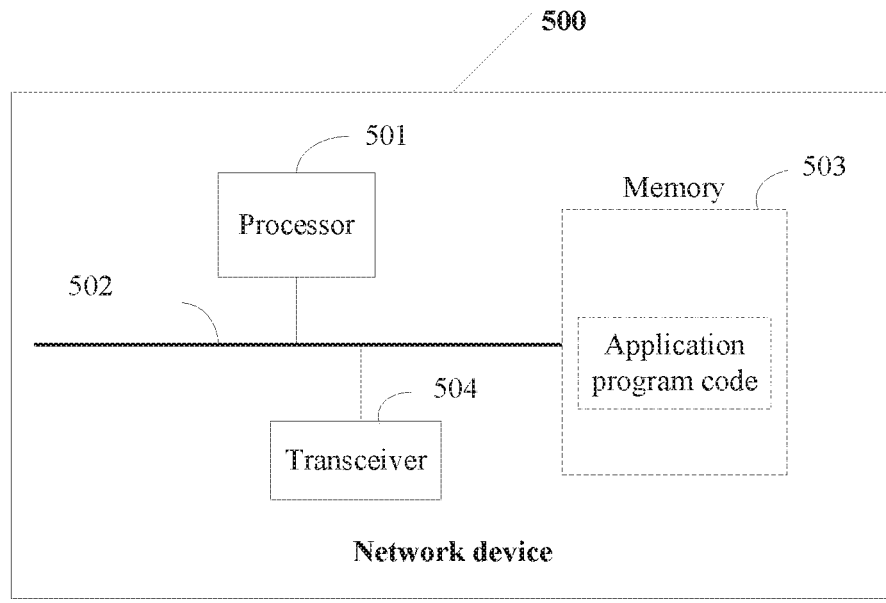
FIG. 7 is a schematic structural diagram of another network device according to an embodiment of the present invention.

The network device in the embodiment shown in FIG. 6 may be implemented by a network device shown in FIG. 7. As shown in FIG. 7, FIG. 7 is a schematic structural diagram of another network device according to an embodiment of the present invention. The network device 500 shown in FIG. 7 includes a processor 501, a bus 502, and a transceiver 504. Optionally, the network device 500 may further include a memory 503. It should be noted that, the transceiver 504 in an actual application is not limited to two transceivers, and a structure of the network device 500 does not constitute a limitation to this embodiment of the present invention.

The processor 501 mainly includes four components: a cell controller, a voice channel controller, a signaling channel controller, and a plurality of extended interfaces. The processor 501 is responsible for management of all mobile communications interfaces, mainly including allocation, releasing, and management of radio channels. The processor 501 is applied to this embodiment of the present invention, and is configured to implement functions of the obtaining unit 401 and the determining unit 403 shown in FIG. 6. The transceiver 504 includes a receiver and a transmitter. The transceiver 504 is applied to this embodiment of the present invention, and is configured to implement functions of the sending unit 402 shown in FIG. 6.

The bus 502 may include a path for transmitting information between the foregoing components. The bus 502 may be a peripheral component interconnect (Peripheral Component Interconnect, PCI) bus or an extended industry standard architecture (Extended Industry Standard Architecture, EISA) bus, or the like. The bus 502 may be classified into an address bus, a data bus, a control bus, and the like. For ease of representation, only one thick line is used to represent the bus in FIG. 7, but this does not mean that there is only one bus or only one type of bus.

The memory 503 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer. This is not limited. The memory 503 may exist independently, and is connected to the processor 501 by the bus 502. The memory 503 may also be integrated with the processor 501.

Optionally, the memory 503 is configured to store application program code used to execute the solution of the present invention, where the application program code is executed under control of the processor 501. The processor 501 is configured to execute the application program code stored in the memory 503.

An embodiment of the present invention further provides a computer storage medium, configured to store a computer software instruction used by the network device shown in FIG. 6 or FIG. 7, where the computer software instruction is used to execute a program designed for the network device in the foregoing aspect. The stored program is executed to send indication information by using a resource of a first system, where the indication information is used to indicate the system resource information, so that a device receiving the indication information determines the system resource information based on the indication information. Therefore, user equipment receiving the indication information can directly determine the system resource information of a second system based on the indication information, without trying a plurality of frequencies one by one to determine the system resource information of the second system. This improves efficiency of determining the second system by the user equipment.

Figure 8:
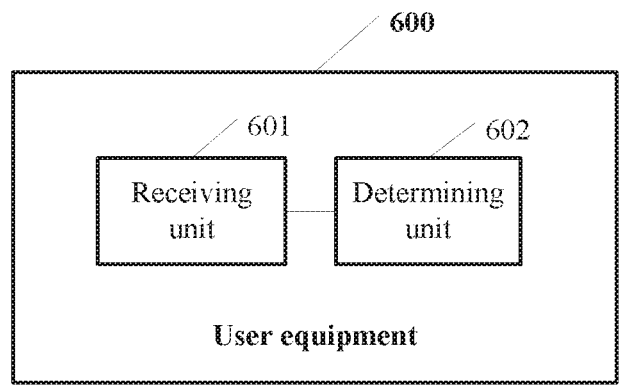
FIG. 8 is a schematic structural diagram of user equipment according to an embodiment of the present invention.

Referring to FIG. 8, FIG. 8 is a schematic structural diagram of user equipment according to an embodiment of the present invention. The user equipment in this embodiment of the present invention may be the user equipment provided by any embodiment in FIG. 2 to FIG. 5. As shown in FIG. 8, the user equipment 600 in this embodiment of the present invention may include a receiving unit 601 and a determining unit 602.

The receiving unit 601 is configured to receive indication information sent by a network device by using a resource of a first system, where the indication information is used to indicate system resource information of a second system.

Optionally, the indication information includes a resource identifier corresponding to the system resource information. In a feasible solution, some or all determined candidate resource information may be numbered, and a mapping relationship between each number and candidate resource information is determined, where the candidate resource information is a center frequency of a single carrier of the second system. When the system resource information is determined from at least one piece of candidate resource information, a number corresponding to the system resource information is determined, and the network device indicates the system resource by using a number included in the indication information. Therefore, after all candidate resource information is determined, a plurality of pieces of candidate resource information that may be used for deploying the second system may be finally determined according to an actual requirement, and then the system resource information of the second system is determined from the finally determined plurality of pieces of candidate resource information.

For example, if total candidate resource information determined in the first system includes 20 frequency locations in which the single carrier of the second system may be deployed, in a feasible solution, the network device may number the 20 frequency locations in sequence, and generate a mapping relationship between frequency locations and numbers, and the network device may indicate the system resource information by sending an indication message carrying a number. Alternatively, in another feasible solution, the network device may select 10 frequency locations from the 20 frequency locations to perform numbering in sequence, and generate another mapping relationship between frequency locations and numbers, and the network device may indicate the system resource information by sending an indication message carrying a number.

For another example, the network device determines some candidate resource information in which the carrier of the second system may be deployed, by using N mod K=0, where N is a number of some selected candidate resource information, and K is an integer greater than 0. Assuming K=2, and numbers of total preset deployment resources are 0 to 100, a number of some selected candidate deployment resource information is N mod 2=0, where N=0, 2, 4 . . . . , and a frequency location corresponding to a selected number is determined: then numbers of some selected candidate resource information are numbered again, and a mapping relationship between frequency locations of some candidate resource information and numbers is generated. The network device may indicate the system resource information by sending an indication message carrying a number.

Optionally, the indication information includes a radio channel number ARFCN corresponding to the system resource information. The network device indicates the system resource by using the ARFCN included in the indication information.

Optionally, the indication information further includes a service identifier corresponding to the system resource information. For example, if the service identifier is 0, it indicates that the second system is used for an NB-IoT service: if the service identifier is 1, it indicates that the second system is used for an MTC service; or if the service identifier is 2, it indicates that the second system is used for a URLLC service.

Optionally, the indication information is included in system information of the first system. The system information includes a master information block (Master Information Block, MIB), a plurality of system information blocks (System Information Blocks, SIBs), and the like. The network device may send the indication message by using the system information.

Optionally, the indication information is sent by using a broadcast channel of the first system.

Optionally, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

Optionally, the single carrier of the second system occupies a preset quantity of resource blocks in the first system, and the preset quantity is a rounded-up ratio of a second frequency width of the single carrier of the second system to a first frequency width of a resource block in the first system.

Optionally, the system resource information is a center frequency of a carrier of the second system; and the center frequency of the carrier of the second system is in a range separated from an integer multiple of a preset frequency by a preset threshold. The preset threshold is half a spacing between subcarriers of the second system or half a spacing between subcarriers of the first system.

Optionally, the system resource information is a center frequency of a carrier of the second system; and the center frequency of the carrier of the second system is a frequency location that has a minimum offset from an integer multiple of a preset frequency, and the offset is an integer multiple of a preset minimum frequency width.

The determining unit 602 is configured to determine the system resource information based on the indication information.

In a feasible implementation, when the indication information includes an identifier corresponding to the system resource information, the determining unit 602 determines, based on a pre-obtained mapping relationship between the identifier and candidate resource information, the candidate resource information corresponding to the received identifier as the system resource information. In another feasible solution, when the indication information includes an ARFCN, the determining unit 602 may determine, based on a pre-obtained mapping relationship between the ARFCN and frequency information, the frequency information corresponding to the received ARFCN as the system resource information. In another feasible solution, when the indication information is a synchronization signal, the determining unit 602 determines, based on a pre-obtained mapping relationship between a resource used by the synchronization signal and candidate resource information, the candidate resource information corresponding to the received synchronization signal as the system resource information. A manner of determining the system resource information by the user equipment based on the indication information is not limited in this embodiment of the present invention.

Figure 9:
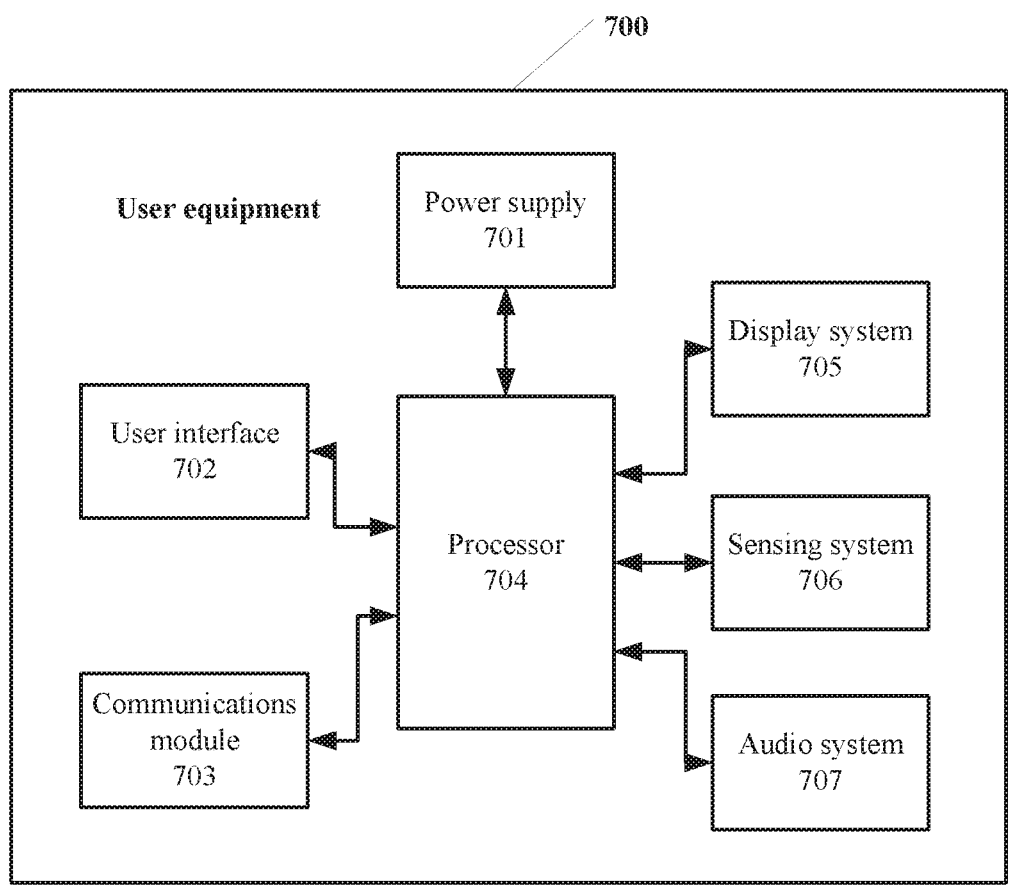
FIG. 9 is a schematic structural diagram of another user equipment according to an embodiment of the present invention.

The user equipment in the embodiment shown in FIG. 8 may be implemented by user equipment shown in FIG. 9. As shown in FIG. 7, FIG. 7 is a schematic structural diagram of another user equipment according to an embodiment of the present invention. The user equipment 700 shown in FIG. 7 includes a power supply 701, a user interface 702, a communications module 703, a processor 704, a display system 705, a sensing system 706, and an audio system 707. It should be noted that, the user equipment 700 may represent the terminal in FIG. 1a, or may represent an electronic device such as a motor vehicle, a non-motor vehicle, another communications device on a road, or a smart appliance, and a structure of the user equipment shown in FIG. 8b does not constitute a limitation to this embodiment of the present invention.

The power supply 701 provides power guarantee for implementing various functions of the user equipment 700. The user interface 702 is configured to connect the user equipment 700 to another device or apparatus, and implement communication or data transmission between the another device or apparatus and the user equipment 700. The communications module 703 is configured to implement communication or data transmission between the user equipment 700 and a network-side device such as a base station or a satellite, and is further configured to implement communication or data transmission between the user equipment 700 and another user equipment. Applied to this embodiment of the present invention, the communications module 703 is configured to implement functions of the receiving unit 502 and the sending unit 503 shown in FIG. 8a. The processor 704 may implement or perform various illustrative logical blocks, modules, and circuits described in the disclosure of the present invention. Applied to this embodiment of the present invention, the processor 703 is configured to implement a function of the processing unit 501 shown in FIG. 8a. The display system 705 is configured to output and display information, and receive an operation input by a user. The sensing system 706 includes various sensors, for example, a temperature sensor and a proximity sensor. The audio system 707 is configured to output an audio signal.

An embodiment of the present invention further provides a computer storage medium, configured to store a computer software instruction used by the user equipment shown in FIG. 8 or FIG. 9, where the computer software instruction is used to execute a program designed for the user equipment in the foregoing aspect. The stored program is executed to determine the system resource information based on received indication information. Therefore, the user equipment can directly determine the system resource information of a second system based on the indication information, without trying a plurality of frequencies one by one to determine the system resource information of the second system. This improves efficiency of determining the second system by the user equipment.

Figure 10:
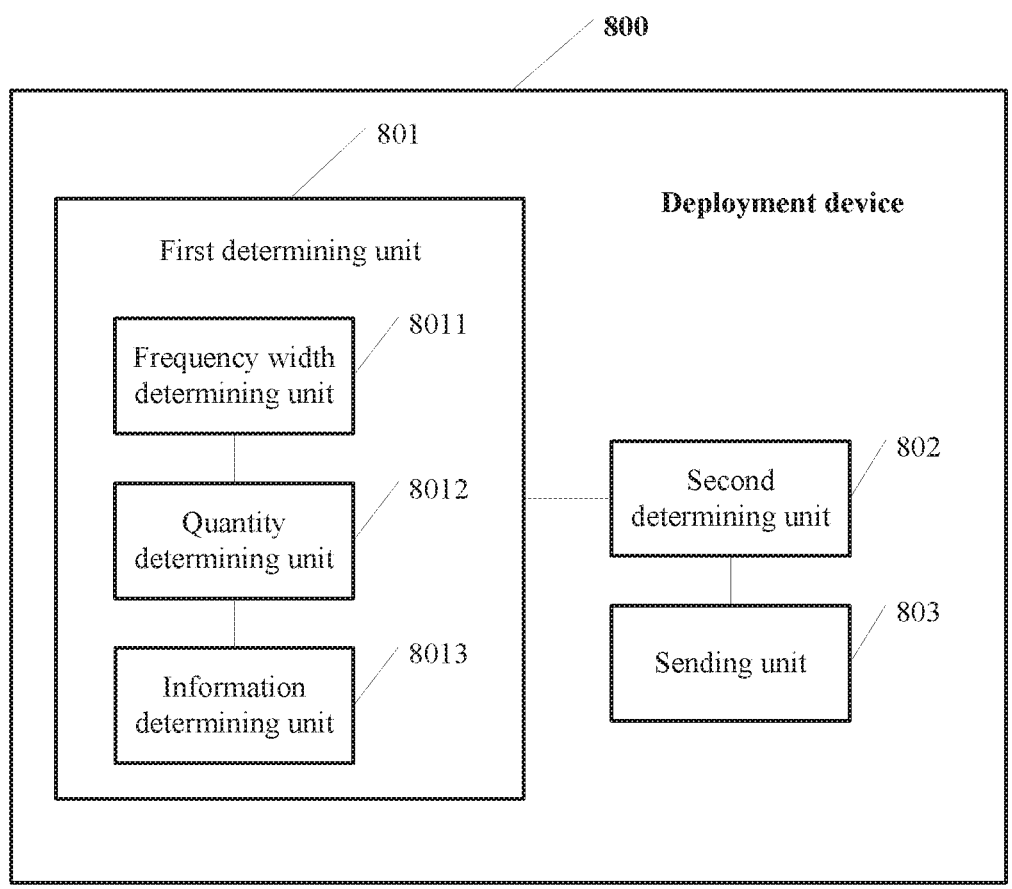
FIG. 10 is a schematic structural diagram of a deployment device according to an embodiment of the present invention.

Referring to FIG. 10, FIG. 10 is a schematic structural diagram of a deployment device according to an embodiment of the present invention. The deployment device in this embodiment of the present invention may be the deployment device provided by any embodiment in FIG. 2 to FIG. 5. As shown in FIG. 10, the deployment device 800 in this embodiment of the present invention may include a first determining unit 801 and a second determining unit 802. Optionally, the deployment device 800 further includes a sending unit 803.

The determining unit 801 is configured to determine, based on resource block information of a plurality of resource blocks included in a first system and information of a single carrier in a second system, at least one piece of candidate resource information of the single carrier deployed in the first system; where the resource block information includes a frequency range of each resource block in the plurality of resource blocks, and the information of the single carrier includes a second frequency width of the single carrier.

The first determining unit 801 may include a frequency determining unit 8011, a quantity determining unit 8012, and an information determining unit 8013.

The frequency width determining unit 8011 is configured to determine a first frequency width of each resource block based on the resource block information of the plurality of resource blocks included in the first system.

Optionally, the first frequency width of each resource block in the first system is different from the second frequency width.

The quantity determining unit 8012 is configured to determine, based on the first frequency width and the information of the single carrier in the second system, a quantity of resource blocks occupied by the single carrier of the second system in the first system.

Optionally, the quantity determining unit 8012 is specifically configured to determine a numeric value obtained through calculation by rounding up a ratio of the second frequency width to the first frequency width, as the quantity of the resource blocks occupied by the single carrier in the first system.

The information determining unit 8013 is configured to select, from the plurality of resource blocks, a quantity of target resource blocks same as the quantity of the resource blocks, and determine candidate resource information of the single carrier deployed on the target resource blocks.

Optionally, the information determining unit 8013 is specifically configured to: determine, in a frequency range of the target resource blocks, at least one integer-multiple frequency satisfying an integer multiple of a preset frequency; search for a target center frequency that is separated from each integer-multiple frequency by a minimum offset, where the target center frequency is a center frequency of a target frequency band whose frequency width is the second frequency width in the frequency range of the target resource blocks, and determine the minimum offset between each integer-multiple frequency and the target center frequency as a first offset corresponding to each integer-multiple frequency; and determine a minimum first offset from the first offset corresponding to each integer-multiple frequency, and determine a location of a target frequency band in which a target center frequency corresponding to the minimum first offset is located, as the candidate resource information of the single carrier.

Optionally, the candidate resource information is a center frequency of the single carrier of the second system; and the center frequency of the single carrier is in a range separated from an integer multiple of the preset frequency by a preset threshold. The preset threshold is half a spacing between subcarriers of the second system or half a spacing between subcarriers of the first system.

Optionally, the candidate resource information is a center frequency of the single carrier of the second system; and the center frequency of the single carrier is a frequency location that has a minimum offset from an integer multiple of the preset frequency, and the offset is an integer multiple of a preset minimum frequency width.

The second determining unit 802 is configured to determine system resource information of the second system from the at least one piece of candidate resource information.

The sending unit 803 is configured to send indication information by using a resource of the first system, where the indication information is used to indicate the system resource information, so that a device receiving the indication information determines the system resource information based on the indication information.

Optionally, the system resource information is information about a resource occupied by the second system in the first system.

Optionally, the indication information includes a resource identifier corresponding to the system resource information. In a feasible solution, some or all determined candidate resource information may be numbered, and a mapping relationship between each number and candidate resource information is determined, where the candidate resource information is the center frequency of the single carrier of the second system. When the system resource information is determined from the at least one piece of candidate resource information, a number corresponding to the system resource information is determined, and the network device indicates the system resource by using a number included in the indication information. For example, if total candidate resource information determined in the first system includes 20 frequency locations in which the single carrier of the second system may be deployed, in a feasible solution, the network device may number the 20 frequency locations in sequence, and generate a mapping relationship between frequency locations and numbers, and the network device may indicate the system resource information by sending an indication message carrying a number. Alternatively, in another feasible solution, the network device may select 10 frequency locations from the 20 frequency locations to perform numbering in sequence, and generate another mapping relationship between frequency locations and numbers, and the network device may indicate the system resource information by sending an indication message carrying a number.

Optionally, the indication information includes a radio channel number ARFCN corresponding to the system resource information. The network device indicates the system resource by using the ARFCN included in the indication information.

Optionally, the indication information further includes a service identifier corresponding to the system resource information. For example, if the service identifier is 0, it indicates that the second system is used for an NB-IoT service; if the service identifier is 1, it indicates that the second system is used for an MTC service; or if the service identifier is 2, it indicates that the second system is used for a URLLC service.

Optionally, the indication information is included in system information of the first system. The system information includes a master information block (Master Information Block, MIB), a plurality of system information blocks (System Information Blocks, SIBs), and the like. The network device may send the indication message by using the system information.

Optionally, the indication information is sent by using a broadcast channel of the first system.

Optionally, the indication information is a synchronization signal, and the synchronization signal indicates the system resource information by using a resource used for sending the synchronization signal by the first system. Optionally, the resource used by the synchronization signal includes one or more of a time resource, a frequency resource, a codeword resource, and a sequence resource used by the synchronization signal.

Figure 11:
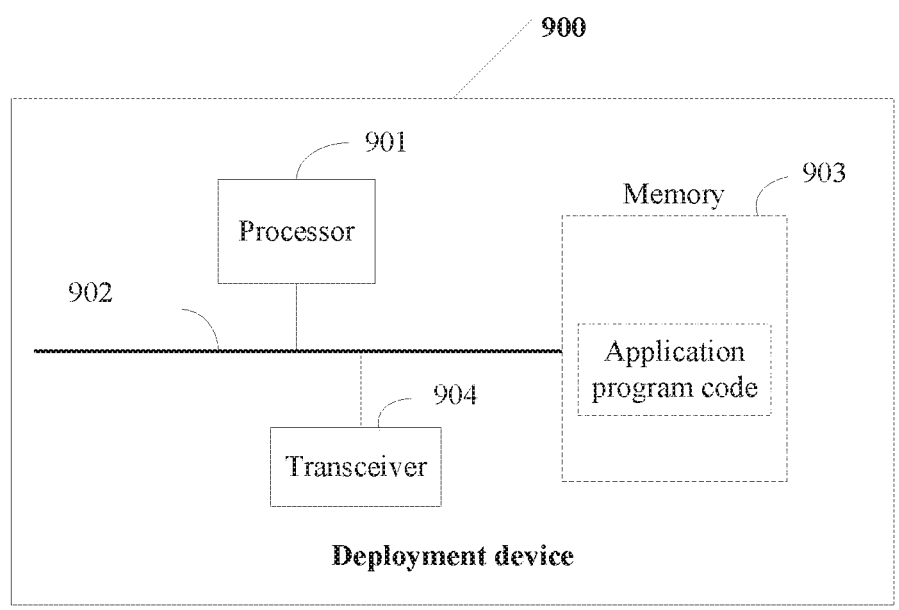
FIG. 11 is a schematic structural diagram of another deployment device according to an embodiment of the present invention.

The deployment device in the embodiment shown in FIG. 10 may be implemented by a deployment device shown in FIG. 11. As shown in FIG. 11, FIG. 11 is a schematic structural diagram of another deployment device according to an embodiment of the present invention. The deployment device 900 shown in FIG. 11 includes a processor 901, a bus 902, and a transceiver 904. Optionally, the deployment device 900 may further include a memory 903. It should be noted that, the transceiver 904 in an actual application is not limited to two transceivers, and a structure of the deployment device 900 does not constitute a limitation to this embodiment of the present invention.

The processor 901 may be a general purpose central processing unit (Central Processing Unit, CPU), a microprocessor, an application-specific integrated circuit (application-specific integrated circuit, ASIC), or one or more integrated circuits for controlling program execution in the solution of the present invention.

The bus 902 may include a path for transmitting information between the foregoing components. The bus 902 may be a peripheral component interconnect (Peripheral Component Interconnect, PCI) bus or an extended industry standard architecture (Extended Industry Standard Architecture, EISA) bus, or the like. The bus 902 may be classified into an address bus, a data bus, a control bus, and the like. For ease of representation, only one thick line is used to represent the bus in FIG. 11, but this does not mean that there is only one bus or only one type of bus.

The memory 903 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital versatile disc, a Blu-ray disc, or the like), a magnetic disk storage medium, or another magnetic storage device, or any other medium capable of carrying or storing expected program code in a form of instructions or data structures and capable of being accessed by a computer. This is not limited. The memory 903 may exist independently, and is connected to the processor 901 by the bus 902. The memory 903 may also be integrated with the processor 901.

Optionally, the memory 903 is configured to store application program code used to execute the solution of the present invention, where the application program code is executed under control of the processor 901. The processor 901 is configured to execute the application program code stored in the memory 903.

An embodiment of the present invention further provides a computer storage medium, configured to store a computer software instruction used by the deployment device shown in FIG. 10 or FIG. 11, where the computer software instruction is used to execute a program designed for the deployment device in the foregoing aspect. The stored program is executed to determine system resource information of a second system based on resource block information of a first system and a second frequency width of the second system. Therefore, when a spacing between subcarriers of the first system is different from a spacing between subcarriers of the second system, a function of deploying the second system in the first system can also be implemented.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

A sequence of the steps of the method in the embodiments of the present invention may be adjusted, and certain steps may also be combined or removed according to an actual requirement.

The units in the apparatus in the embodiments of the present invention may be combined, divided, and deleted according to an actual requirement. A person skilled in the art may combine or integrate different embodiments and features of the different embodiments described in the specification.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (Random Access Memory, RAM), a read-only memory (Read-Only Memory, ROM), an electrically erasable programmable read-only memory (Electrically Erasable Programmable Read-Only Memory, EEPROM), a compact disc read-only memory (Compact Disc Read-Only Memory, CD-ROM) or other optical disk storage, a disk storage medium or other disk storage, or any other medium capable of carrying or storing expected program code in a form of instructions or data structures and capable of being accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (Digital Subscriber Line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A resource indication method, comprising:
   obtaining, by a first system, a second system carrier frequency for a second system, wherein the first system comprises a first system resource; and
   sending, by the first system, an indication of the second system carrier frequency to a device using the first system resource, wherein the indication of the second system carrier frequency occupies a preset quantity of resource blocks in the first system, and wherein the preset quantity is a rounded-up ratio of a second frequency width of the second system carrier frequency to a first frequency width of a resource block in the first system.

2. The resource indication method of claim 1, wherein the first system comprises a plurality of first system carrier frequencies, and wherein the second system carrier frequency is the same as one of the first system carrier frequencies.

3. The resource indication method of claim 1, wherein the indication is part of system information of the first system.

4. The resource indication method of claim 1, wherein the second system carrier frequency corresponds to a center frequency of a carrier of the second system, and wherein the center frequency of the carrier of the second system is in a range separated from an integer multiple of a preset frequency by a preset threshold.

5. The resource indication method of claim 1, wherein the second system carrier frequency corresponds to a center frequency of a carrier of the second system, wherein the center frequency of the carrier of the second system is a frequency having a minimum offset from an integer multiple of a preset frequency, and wherein the minimum offset is an integer multiple of a preset minimum frequency width.

6. The resource indication method of claim 1, wherein before obtaining the second system carrier frequency, the resource indication method further comprises determining, based on resource block information of a plurality of resource blocks that is part of the first system and information of a single carrier in the second system, at least one piece of candidate resource information of a single carrier deployed in the first system, wherein the resource block information comprises a frequency range of each resource block in the resource blocks, wherein the information of the single carrier in the second system comprises a second frequency width of the single carrier in the second system, and wherein obtaining the second system carrier frequency comprises determining the second system carrier frequency from the at least one piece of the candidate resource information.

7. A resource indication method, comprising:
   receiving, by a user equipment, an indication from a network device using a first system resource for a first system, wherein the indication indicates system resource information of a second system, wherein a single carrier of the second system occupies a preset quantity of resource blocks in the first system, and wherein the preset quantity is a rounded-up ratio of a second frequency width of the single carrier of the second system to a first frequency width of a resource block in the first system;
   determining, by the user equipment, the system resource information based on the indication; and
   accessing, by the user equipment, the second system using the system resource information.

8. The resource indication method of claim 7, wherein the system resource information comprises a second system carrier frequency for the second system, wherein the first system comprises a plurality of first system carrier frequencies, and wherein the second system carrier frequency is the same as one of the first system carrier frequencies.

9. The resource indication method of claim 7, wherein the indication is part of system information of the first system.

10. The resource indication method of claim 7, wherein the system resource information is a center frequency of a carrier of the second system, and wherein the center frequency of the carrier of the second system is in a range separated from an integer multiple of a preset frequency by a preset threshold.

11. The resource indication method of claim 10, wherein the preset threshold is half a spacing among subcarriers of the second system.

12. A system deployment method, comprising:
   determining, based on resource block information of a plurality of resource blocks that are part of a first system and information of a single carrier in a second system, at least one piece of candidate resource information of a single carrier deployed in the first system;
   determining system resource information of the second system from the at least one piece of the candidate resource information, wherein the resource block information comprises a frequency range of each resource block in the resource blocks, and wherein the information of the single carrier in the second system comprises a second frequency width of the single carrier in the second system; and
   implementing a function of deploying the second system in the first system when a spacing among subcarriers of the first system is different from a spacing among subcarriers of the second system.

13. The system deployment method of claim 12, wherein determining the at least one piece of the candidate resource information of the single carrier deployed in the first system comprises:
- determining a first frequency width of each resource block based on the resource block information of the resource blocks that are part of the first system;
- determining, based on the first frequency width and the information of the single carrier in the second system, a quantity of resource blocks occupied by the single carrier of the second system in the first system;
- selecting, from the resource blocks, a quantity of target resource blocks same as the quantity of the resource blocks; and
- determining candidate resource information of a single carrier deployed on the target resource blocks.

14. The system deployment method of claim 13, wherein determining the quantity of the resource blocks occupied by the single carrier of the second system in the first system comprises determining a numeric value obtained through calculation by rounding up a ratio of the second frequency width to the first frequency width as the quantity of the resource blocks occupied by the single carrier in the first system.

15. The system deployment method of claim 12, wherein the candidate resource information is a center frequency of the single carrier of the second system, and wherein the center frequency of the single carrier is in a range separated from an integer multiple of a preset frequency by a preset threshold.

16. The system deployment method of claim 13, wherein selecting the quantity of the target resource blocks same as the quantity of the resource blocks and determining the candidate resource information of the single carrier deployed on the target resource blocks comprises:
- determining, in a frequency range of the target resource blocks, at least one integer-multiple frequency, wherein the at least one integer-multiple frequency is an integer multiple of a preset frequency;
- searching for a target center frequency separated from each integer-multiple frequency by a minimum offset, wherein the target center frequency is a center frequency of a target frequency band whose frequency width is the second frequency width in the frequency range of the target resource blocks;
- determining the minimum offset between each integer-multiple frequency and the target center frequency as a first offset corresponding to each integer-multiple frequency;
- determining a minimum first offset from the first offset corresponding to each integer-multiple frequency; and
- determining a target frequency band in which a target center frequency corresponding to the minimum first offset is located as the candidate resource information of the single carrier.

17. The method of claim 12, further comprising sending indication information using a resource of the first system, wherein the indication information indicates the system resource information such that a device receiving the indication information to determine the system resource information based on the indication information.

18. The resource indication method of claim 10, wherein the preset threshold is half a spacing among subcarriers of the second system or half a spacing among subcarriers of the first system.

* * * * *